(12) United States Patent
Whitehurst et al.

(10) Patent No.: US 8,747,204 B2
(45) Date of Patent: Jun. 10, 2014

(54) SYSTEM AND METHOD OF PLAYING A GAME ON AN ELECTRONIC DEVICE

(75) Inventors: Timothy Whitehurst, Lakewood Ranch, FL (US); Duayne Whitehurst, Osprey, FL (US)

(73) Assignee: Pixel After Pixel, Inc., Lakewood Ranch, FL (US)

( * ) Notice: Subject to any disclaimer, the term of this patent is extended or adjusted under 35 U.S.C. 154(b) by 0 days.

(21) Appl. No.: 13/348,092

(22) Filed: Jan. 11, 2012

(65) Prior Publication Data

US 2012/0196662 A1 Aug. 2, 2012

Related U.S. Application Data

(60) Provisional application No. 61/431,457, filed on Jan. 11, 2011.

(51) Int. Cl.
*A63F 13/00* (2014.01)

(52) U.S. Cl.
USPC .......... 463/13; 463/7; 463/9; 463/11; 463/12; 463/16; 463/20; 463/22; 463/25; 463/43

(58) Field of Classification Search
USPC ............... 463/7, 16–20, 25, 40–43, 9–13, 22
See application file for complete search history.

(56) References Cited

U.S. PATENT DOCUMENTS

| 7,309,280 | B2 * | 12/2007 | Toyoda | 463/16 |
|---|---|---|---|---|
| 7,604,541 | B2 * | 10/2009 | Aikin et al. | 463/42 |
| 2002/0103029 | A1 * | 8/2002 | Finlayson et al. | 463/42 |
| 2010/0203953 | A1 * | 8/2010 | Alderucci et al. | 463/25 |
| 2011/0021263 | A1 * | 1/2011 | Anderson et al. | 463/25 |
| 2011/0105206 | A1 * | 5/2011 | Rowe | 463/9 |

* cited by examiner

*Primary Examiner* — Sunit Pandya
(74) *Attorney, Agent, or Firm* — Perry M. Fonseca

(57) ABSTRACT

A system, method and device for playing SNAG-IT© on an electronic device is provided. The device includes an electronic circuit, an input device and a display. The method includes receiving a selection of the number and location of human players, the number of computer players and the number of decks for the game, a selection of the personality type and urges for each computer player; by the electronic. Next, the cards are electronically shuffled and each player is dealt a predetermined number of cards. An electronic game board is generated and displayed, and the electronic circuit provides each player a game turn in succession, until a game ending event occurs.

20 Claims, 29 Drawing Sheets

*Examples*

Figure 3 (prior art)
*Examples*
1. Equal Value, Different Suit
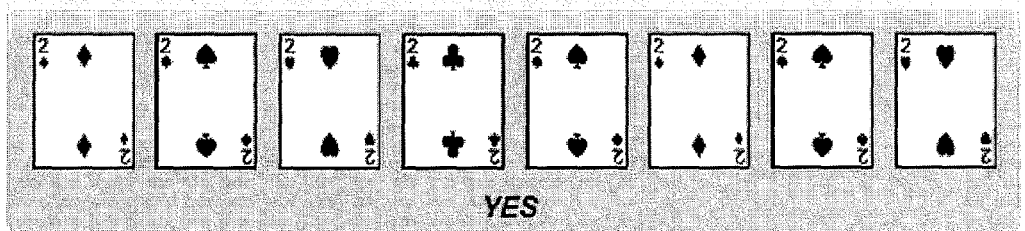
YES
2. Sequential Value, Same Suit
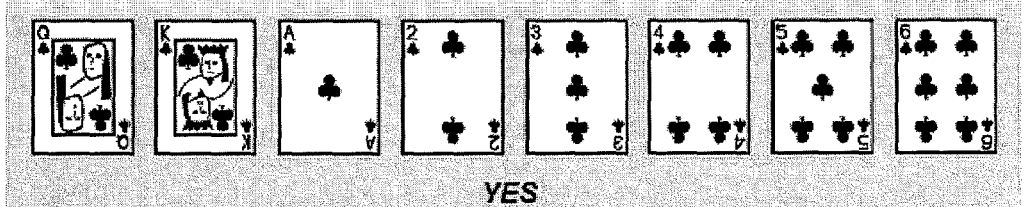
YES
3. Combinations of Examples 1 and 2 above
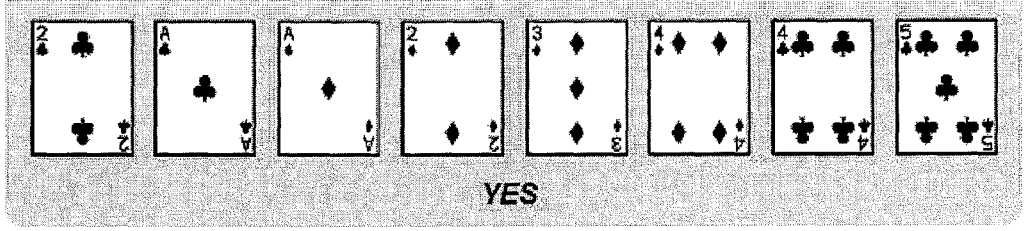
YES FIGURE 4 (PRIOR ART)
Examples
"King of Clubs" captures this Space next to a previously played card, earning 1 point for the Snag-it.
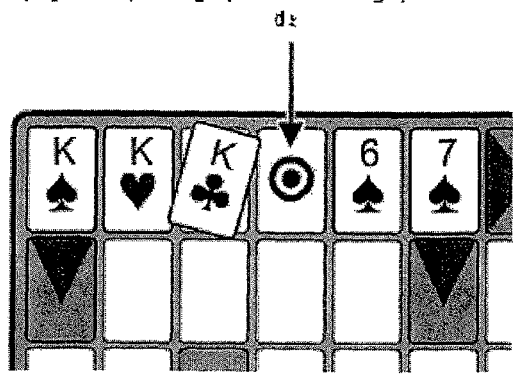
"3 of Diamonds" captures these Reserved Spaces, earning 2 points:
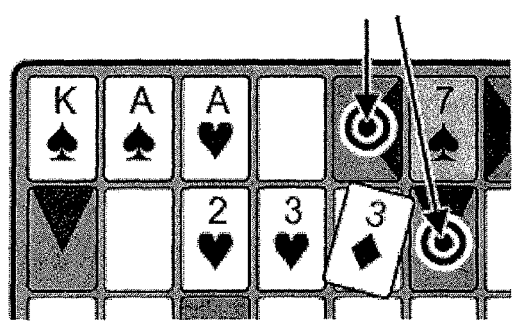

Example flowchart of machine logic:

Figure 7

Example board configurations:

Example Hybrid board visualizations:

Figure 9

Example of Node Designations or Card Values on Board:

| 1,1 | 2,1 | 3,1 | 4,1 | 5,1 | 6,1 | 7,1 | 8,1 | 9,1 | 10,1 | 11,1 | 12,1 | 13,1 | 14,1 | 15,1 |
|---|---|---|---|---|---|---|---|---|---|---|---|---|---|---|
| NP | NP | NP | NP | NP | NP | NP | NP | NP | NP | NP | NP | NP | NP | NP |
| 1 | 2 | 3 | 4 | 5 | 6 | 7 | 8 | 9 | 10 | 11 | 12 | 13 | 14 | 15 |
| 1,2 | 2,2 | 3,2 | 4,2 | 5,2 | 6,2 | 7,2 | 8,2 | 9,2 | 10,2 | 11,2 | 12,2 | 13,2 | 14,2 | 15,2 |
| NP | NP | NP | NP | NP | NP | NP | NP | NP | NP | NP | NP | NP | NP | NP |
| 16 | 17 | 18 | 19 | 20 | 21 | 22 | 23 | 24 | 25 | 26 | 27 | 28 | 29 | 30 |
| 1,3 | 2,3 | 3,3 | | 5,3 | 6,3 | | 8,3 | | 10,3 | 11,3 | | 13,3 | 14,3 | 15,3 |
| NP | NP | STKS | BL | BL | BL | BL | ST7S | BL | BL | BL | BL | STAH | NP | NP |
| 31 | 32 | 33 | | 35 | 36 | | 38 | | 40 | 41 | | 43 | 44 | 45 |
| 1,4 | 2,4 | | 4,4 | 5,4 | 6,4 | 7,4 | | 9,4 | 10,4 | 11,4 | 12,4 | | 14,4 | 15,4 |
| NP | NP | BL | BL | BL | BL | BL | BL | BL | BL | BL | BL | BL | NP | NP |
| 46 | 47 | | 49 | 50 | 51 | 52 | | 54 | 55 | 56 | 57 | | 59 | 60 |
| 1,5 | 2,5 | 3,5 | 4,5 | 5,5 | 6,5 | 7,5 | 8,5 | 9,5 | 10,5 | 11,5 | 12,5 | 13,5 | 14,5 | 15,5 |
| NP | NP | BL | BL | SPS | BL | BL | BL | BL | BL | SPH | BL | BL | NP | NP |
| 61 | 62 | 63 | 64 | 65 | 66 | 67 | 68 | 69 | 70 | 71 | 72 | 73 | 74 | 75 |
| 1,6 | 2,6 | 3,6 | 4,6 | 5,6 | 6,6 | | 8,6 | | 10,6 | 11,6 | 12,6 | 13,6 | 14,6 | 15,6 |
| NP | NP | BL | BL | BL | BL | BL | BL | BL | BL | BL | BL | BL | NP | NP |
| 76 | 77 | 78 | 79 | 80 | 81 | | 83 | | 85 | 86 | 87 | 88 | 89 | 90 |
| 1,7 | 2,7 | | 4,7 | 5,7 | | 7,7 | 8,7 | 9,7 | | 11,7 | 12,7 | | 14,7 | 15,7 |
| NP | NP | BL | BL | BL | BL | STAS | NP | STKH | BL | BL | BL | BL | NP | NP |
| 91 | 92 | | 94 | 95 | | 97 | 98 | 99 | | 101 | 102 | | 104 | 105 |
| 1,8 | 2,8 | 3,8 | | 5,8 | 6,8 | 7,8 | 8,8 | 9,8 | 10,8 | 11,8 | | 13,8 | 14,8 | 15,8 |
| NP | NP | ST7D | BL | BL | BL | NP | | NP | BL | BL | BL | ST7H | NP | NP |
| 106 | 107 | 108 | | 110 | 111 | 112 | 113 | 114 | 115 | 116 | | 118 | 119 | 120 |
| 1,9 | 2,9 | | 4,9 | 5,9 | | 7,9 | 8,9 | 9,9 | | 11,9 | 12,9 | | 14,9 | 15,9 |
| NP | NP | BL | BL | BL | BL | STKD | NP | STAC | BL | BL | BL | BL | NP | NP |
| 121 | 122 | | 124 | 125 | | 127 | 128 | 129 | | 131 | 132 | | 134 | 135 |
| 1,10 | 2,10 | 3,10 | 4,10 | 5,10 | 6,10 | | 8,10 | | 10,10 | 11,10 | 12,10 | 13,10 | 14,10 | 15,10 |
| NP | NP | BL | BL | BL | BL | BL | BL | BL | BL | BL | BL | BL | NP | NP |
| 136 | 137 | 138 | 139 | 140 | 141 | | 143 | | 145 | 146 | 147 | 148 | 149 | 150 |
| 1,11 | 2,11 | 3,11 | 4,11 | 5,11 | 6,11 | 7,11 | 8,11 | 9,11 | 10,11 | 11,11 | 12,11 | 13,11 | 14,11 | 15,11 |
| NP | NP | BL | BL | SPD | BL | BL | BL | BL | BL | SPC | BL | BL | NP | NP |
| 151 | 152 | 153 | 154 | 155 | 156 | 157 | 158 | 159 | 160 | 161 | 162 | 163 | 164 | 165 |
| 1,12 | 2,12 | 3,12 | 4,12 | 5,12 | 6,12 | 7,12 | 8,12 | 9,12 | 10,12 | 11,12 | 12,12 | 13,12 | 14,12 | 15,12 |
| NP | NP | BL | BL | BL | BL | BL | BL | BL | BL | BL | BL | BL | NP | NP |
| 166 | 167 | 168 | 169 | 170 | 171 | 172 | 173 | 174 | 175 | 176 | 177 | 178 | 179 | 180 |
| 1,13 | 2,13 | 3,13 | | 5,13 | 6,13 | 7,13 | 8,13 | 9,13 | 10,13 | 11,13 | 12,13 | 13,13 | 14,13 | 15,13 |
| NP | NP | STAD | BL | BL | BL | BL | ST7C | BL | BL | BL | BL | STKC | NP | NP |
| 181 | 182 | 183 | 184 | 185 | 186 | 187 | 188 | 189 | 190 | 191 | 192 | 193 | 194 | 195 |
| 1,14 | 2,14 | 3,14 | 4,14 | 5,14 | 6,14 | 7,14 | 8,14 | 9,14 | 10,14 | 11,14 | 12,14 | 13,14 | 14,14 | 15,14 |
| NP | NP | NP | NP | NP | NP | NP | NP | NP | NP | NP | NP | NP | NP | NP |
| 196 | 197 | 198 | 199 | 200 | 201 | 202 | 203 | 204 | 205 | 206 | 207 | 208 | 209 | 210 |
| 1,15 | 2,15 | 3,15 | 4,15 | 5,15 | 6,15 | 7,15 | 8,15 | 9,15 | 10,15 | 11,15 | 12,15 | 13,15 | 14,15 | 15,15 |
| NP | NP | NP | NP | NP | NP | NP | NP | NP | NP | NP | NP | NP | NP | NP |
| 211 | 212 | 213 | 214 | 215 | 216 | 217 | 218 | 219 | 220 | 221 | 222 | 223 | 224 | 225 |

ILLUSTRATION SHOWING HIGHLIGHTING FROM CORE GAME FUNCTIONALITY

Figure 12a
General Examples of 2 AI Opponents Play
Example #1
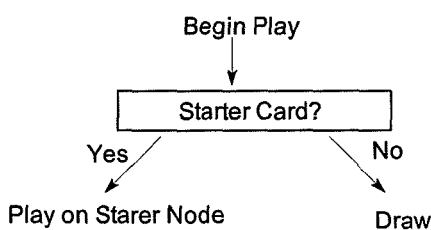
Example #2
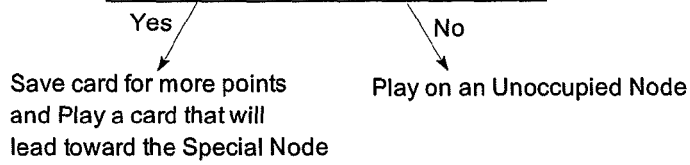
Example #3
Example #4

Figure 12c
Example #9 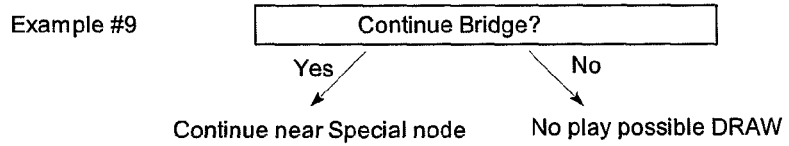
Example #10 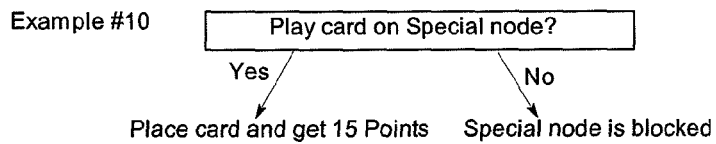
Example #11 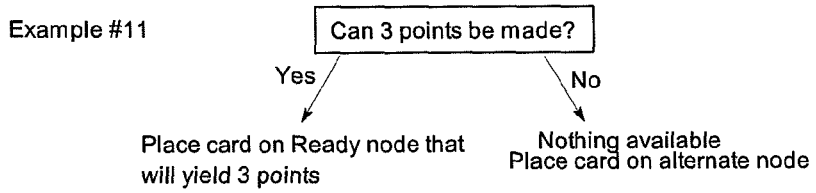
Example #12 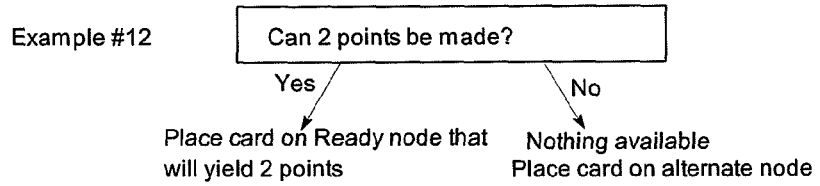

Figure 12d
Example #13
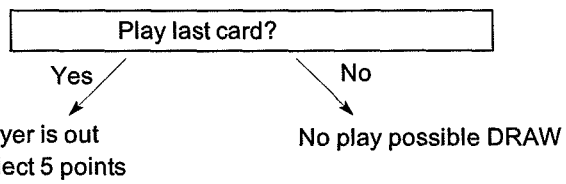
Example #14
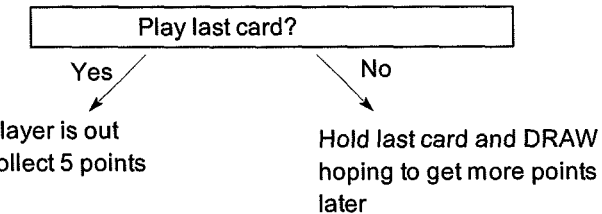

Figure 13

DATA SUPPORTING LOGIC FOR MAKING AI DECISIONS

| cards needed to connect | Potenitial cards | Connection Probability | Likelyhood of Being Dealt | Stop Probability | Opponent | Opponent Chances | Known Cards | POINTS | Possibility to Play | Plays | Risk | Consv | 15.0 Plays | Risk | Consv | Joker Probability |
|---|---|---|---|---|---|---|---|---|---|---|---|---|---|---|---|---|
| 1 | 16 | 1.36E-01 | 7 | 0.14 | 0.13 | 0.02 | | 0.10 | 0.9 | 1 | 0.6 | 0.3 | 1 | 9.5 | 4.1 | 0.05 |
| 2 | | 2.05E-02 | 49 | 0.29 | 0.29 | 0.04 | | 0.20 | 0.8 | 2 | 0.4 | 0.1 | 2 | 5.9 | 1.1 | |
| 3 | | 3.07E-03 | 326 | 0.43 | 0.44 | | | 0.29 | 0.7 | 3 | 0.2 | 0.0 | 3 | 3.6 | 0.3 | |
| 4 | | 4.60E-04 | 2173 | 0.57 | 0.58 | | | 0.39 | 0.6 | 4 | 0.1 | 0.0 | 4 | 2.2 | 0.1 | |
| 5 | | 6.90E-05 | 14486 | 0.71 | 0.73 | | | 0.49 | 0.5 | 5 | 0.1 | 0.0 | 5 | 1.3 | 0.0 | |
| 6 | | 1.04E-05 | 96571 | 0.86 | 0.87 | | | 0.59 | 0.4 | 6 | 0.0 | 0.0 | 6 | 0.7 | 0.0 | |
| 7 | | 1.55E-06 | 643804 | 1.00 | 1.00 | | | 0.68 | 0.3 | 7 | 0.0 | 0.0 | 7 | 0.4 | 0.0 | |

| Decline Rate | 0.7 | 0.3 |
|---|---|---|
| Distance | Risk | Consv |
| 1 | 0.7 | 0.3 |
| 2 | 0.5 | 0.1 |
| 3 | 0.3 | 0.0 |
| 4 | 0.2 | 0.0 |
| 5 | 0.2 | 0.0 |
| 6 | 0.1 | 0.0 |
| 7 | 0.1 | 0.0 |

FIGURE 16
SCANNING FOR POINTS
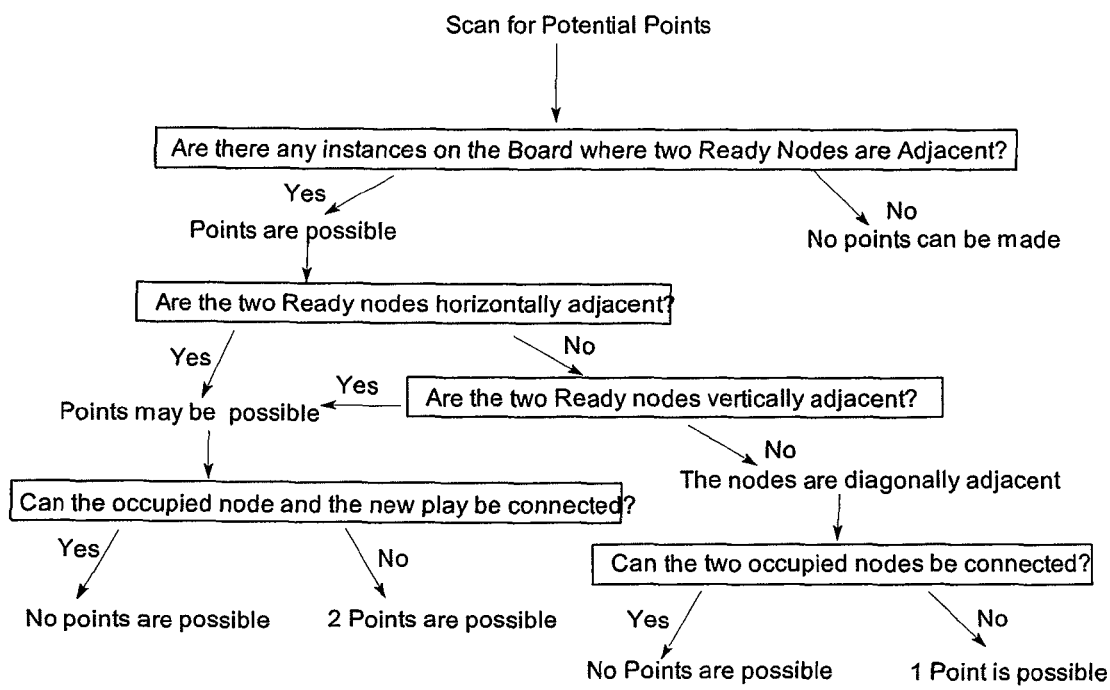

Figure 17 a.

Example Data Chart of cards played on Nodes, including Node Designations or Card Values:

| BOARD LOCATION TABLE | | | | | | |
|---|---|---|---|---|---|---|
| Matrix X-Location | Matrix Y-Location | Matrix Location | NODE NUMBER | STARTING OCCUPYING CARD | PLAYED OCCUPYING CARD | |
| 1 | 1 | 1,1 | 1 | NP | NP | 0 |
| 2 | 1 | 2,1 | 2 | NP | NP | 0 |
| 3 | 1 | 3,1 | 3 | NP | NP | 0 |
| 4 | 1 | 4,1 | 4 | NP | NP | 0 |
| 5 | 1 | 5,1 | 5 | NP | NP | 0 |
| 6 | 1 | 6,1 | 6 | NP | NP | 0 |
| 7 | 1 | 7,1 | 7 | NP | NP | 0 |
| 8 | 1 | 8,1 | 8 | NP | NP | 0 |
| 9 | 1 | 9,1 | 9 | NP | NP | 0 |
| 10 | 1 | 10,1 | 10 | NP | NP | 0 |
| 11 | 1 | 11,1 | 11 | NP | NP | 0 |
| 12 | 1 | 12,1 | 12 | NP | NP | 0 |
| 13 | 1 | 13,1 | 13 | NP | NP | 0 |
| 14 | 1 | 14,1 | 14 | NP | NP | 0 |
| 15 | 1 | 15,1 | 15 | NP | NP | 0 |
| 1 | 2 | 1,2 | 16 | NP | NP | 0 |
| 2 | 2 | 2,2 | 17 | NP | NP | 0 |
| 3 | 2 | 3,2 | 18 | NP | NP | 0 |
| 4 | 2 | 4,2 | 19 | NP | NP | 0 |
| 5 | 2 | 5,2 | 20 | NP | NP | 0 |
| 6 | 2 | 6,2 | 21 | NP | NP | 0 |
| 7 | 2 | 7,2 | 22 | NP | NP | 0 |
| 8 | 2 | 8,2 | 23 | NP | NP | 0 |
| 9 | 2 | 9,2 | 24 | NP | NP | 0 |
| 10 | 2 | 10,2 | 25 | NP | NP | 0 |
| 11 | 2 | 11,2 | 26 | NP | NP | 0 |
| 12 | 2 | 12,2 | 27 | NP | NP | 0 |
| 13 | 2 | 13,2 | 28 | NP | NP | 0 |
| 14 | 2 | 14,2 | 29 | NP | NP | 0 |
| 15 | 2 | 15,2 | 30 | NP | NP | 0 |

Figure 17b

| | | | | | | |
|---|---|---|---|---|---|---|
| 1 | 3 | 1,3 | 31 | NP | NP | 0 |
| 2 | 3 | 2,3 | 32 | NP | NP | 0 |
| 3 | 3 | 3,3 | 33 | STKS | STKS | 0 |
| 4 | 3 | 4,3 | 34 | BL | | 0 |
| 5 | 3 | 5,3 | 35 | BL | | 0 |
| 6 | 3 | 6,3 | 36 | BL | | 0 |
| 7 | 3 | 7,3 | 37 | BL | | 0 |
| 8 | 3 | 8,3 | 38 | ST7S | ST7S | 0 |
| 9 | 3 | 9,3 | 39 | BL | | 0 |
| 10 | 3 | 10,3 | 40 | BL | | 0 |
| 11 | 3 | 11,3 | 41 | BL | | 0 |
| 12 | 3 | 12,3 | 42 | BL | | 0 |
| 13 | 3 | 13,3 | 43 | STAH | STAH | 0 |
| 14 | 3 | 14,3 | 44 | NP | NP | 0 |
| 15 | 3 | 15,3 | 45 | NP | NP | 0 |
| 1 | 4 | 1,4 | 46 | NP | NP | 0 |
| 2 | 4 | 2,4 | 47 | NP | NP | 0 |
| 3 | 4 | 3,4 | 48 | BL | | 0 |
| 4 | 4 | 4,4 | 49 | BL | | 0 |
| 5 | 4 | 5,4 | 50 | BL | | 0 |
| 6 | 4 | 6,4 | 51 | BL | | 0 |
| 7 | 4 | 7,4 | 52 | BL | | 0 |
| 8 | 4 | 8,4 | 53 | BL | | 0 |
| 9 | 4 | 9,4 | 54 | BL | | 0 |
| 10 | 4 | 10,4 | 55 | BL | | 0 |
| 11 | 4 | 11,4 | 56 | BL | | 0 |
| 12 | 4 | 12,4 | 57 | BL | | 0 |
| 13 | 4 | 13,4 | 58 | BL | | 0 |
| 14 | 4 | 14,4 | 59 | NP | NP | 0 |
| 15 | 4 | 15,4 | 60 | NP | NP | 0 |
| 1 | 5 | 1,5 | 61 | NP | NP | 0 |
| 2 | 5 | 2,5 | 62 | NP | NP | 0 |
| 3 | 5 | 3,5 | 63 | BL | | 0 |
| 4 | 5 | 4,5 | 64 | BL | | 0 |
| 5 | 5 | 5,5 | 65 | | | 0 |
| 6 | 5 | 6,5 | 66 | BL | | 0 |
| 7 | 5 | 7,5 | 67 | BL | | 0 |
| 8 | 5 | 8,5 | 68 | BL | | 0 |
| 9 | 5 | 9,5 | 69 | BL | | 0 |
| 10 | 5 | 10,5 | 70 | BL | | 0 |
| 11 | 5 | 11,5 | 71 | | | 0 |

Figure 17c

| | | | | | | |
|---|---|---|---|---|---|---|
| 12 | 5 | 12,5 | 72 | BL | | 0 |
| 13 | 5 | 13,5 | 73 | BL | | 0 |
| 14 | 5 | 14,5 | 74 | NP | NP | 0 |
| 15 | 5 | 15,5 | 75 | NP | NP | 0 |
| 1 | 6 | 1,6 | 76 | NP | NP | 0 |
| 2 | 6 | 2,6 | 77 | NP | NP | 0 |
| 3 | 6 | 3,6 | 78 | BL | | 0 |
| 4 | 6 | 4,6 | 79 | BL | | 0 |
| 5 | 6 | 5,6 | 80 | BL | | 0 |
| 6 | 6 | 6,6 | 81 | BL | | 0 |
| 7 | 6 | 7,6 | 82 | BL | | 0 |
| 8 | 6 | 8,6 | 83 | BL | | 0 |
| 9 | 6 | 9,6 | 84 | BL | | 0 |
| 10 | 6 | 10,6 | 85 | BL | | 0 |
| 11 | 6 | 11,6 | 86 | BL | | 0 |
| 12 | 6 | 12,6 | 87 | BL | | 0 |
| 13 | 6 | 13,6 | 88 | BL | | 0 |
| 14 | 6 | 14,6 | 89 | NP | NP | 0 |
| 15 | 6 | 15,6 | 90 | NP | NP | 0 |
| 1 | 7 | 1,7 | 91 | NP | NP | 0 |
| 2 | 7 | 2,7 | 92 | NP | NP | 0 |
| 3 | 7 | 3,7 | 93 | BL | | 0 |
| 4 | 7 | 4,7 | 94 | BL | | 0 |
| 5 | 7 | 5,7 | 95 | BL | | 0 |
| 6 | 7 | 6,7 | 96 | BL | | 0 |
| 7 | 7 | 7,7 | 97 | STAS | STAS | 0 |
| 8 | 7 | 8,7 | 98 | NP | NP | 0 |
| 9 | 7 | 9,7 | 99 | STKH | STKH | 0 |
| 10 | 7 | 10,7 | 100 | BL | | 0 |
| 11 | 7 | 11,7 | 101 | BL | | 0 |
| 12 | 7 | 12,7 | 102 | BL | | 0 |
| 13 | 7 | 13,7 | 103 | BL | | 0 |
| 14 | 7 | 14,7 | 104 | NP | NP | 0 |
| 15 | 7 | 15,7 | 105 | NP | NP | 0 |
| 1 | 8 | 1,8 | 106 | NP | NP | 0 |
| 2 | 8 | 2,8 | 107 | NP | NP | 0 |
| 3 | 8 | 3,8 | 108 | ST7D | ST7D | 0 |
| 4 | 8 | 4,8 | 109 | BL | | 0 |
| 5 | 8 | 5,8 | 110 | BL | | 0 |
| 6 | 8 | 6,8 | 111 | BL | | 0 |
| 7 | 8 | 7,8 | 112 | NP | NP | 0 |

Figure 17d

| | | | | | | |
|---|---|---|---|---|---|---|
| 8 | 8 | 8,8 | 113 | DK | | 0 |
| 9 | 8 | 9,8 | 114 | NP | NP | 0 |
| 10 | 8 | 10,8 | 115 | BL | | 0 |
| 11 | 8 | 11,8 | 116 | BL | | 0 |
| 12 | 8 | 12,8 | 117 | BL | | 0 |
| 13 | 8 | 13,8 | 118 | ST7H | ST7H | 0 |
| 14 | 8 | 14,8 | 119 | NP | NP | 0 |
| 15 | 8 | 15,8 | 120 | NP | NP | 0 |
| 1 | 9 | 1,9 | 121 | NP | NP | 0 |
| 2 | 9 | 2,9 | 122 | NP | NP | 0 |
| 3 | 9 | 3,9 | 123 | BL | | 0 |
| 4 | 9 | 4,9 | 124 | BL | | 0 |
| 5 | 9 | 5,9 | 125 | BL | | 0 |
| 6 | 9 | 6,9 | 126 | BL | | 0 |
| 7 | 9 | 7,9 | 127 | STKD | STKD | 0 |
| 8 | 9 | 8,9 | 128 | NP | NP | 0 |
| 9 | 9 | 9,9 | 129 | STAC | STAC | 0 |
| 10 | 9 | 10,9 | 130 | BL | | 0 |
| 11 | 9 | 11,9 | 131 | BL | | 0 |
| 12 | 9 | 12,9 | 132 | BL | | 0 |
| 13 | 9 | 13,9 | 133 | BL | | 0 |
| 14 | 9 | 14,9 | 134 | NP | NP | 0 |
| 15 | 9 | 15,9 | 135 | NP | NP | 0 |
| 1 | 10 | 1,10 | 136 | NP | NP | 0 |
| 2 | 10 | 2,10 | 137 | NP | NP | 0 |
| 3 | 10 | 3,10 | 138 | BL | | 0 |
| 4 | 10 | 4,10 | 139 | BL | | 0 |
| 5 | 10 | 5,10 | 140 | BL | | 0 |
| 6 | 10 | 6,10 | 141 | BL | | 0 |
| 7 | 10 | 7,10 | 142 | BL | | 1 |
| 8 | 10 | 8,10 | 143 | BL | | 1 |
| 9 | 10 | 9,10 | 144 | BL | | 1 |
| 10 | 10 | 10,10 | 145 | BL | | 0 |
| 11 | 10 | 11,10 | 146 | BL | | 0 |
| 12 | 10 | 12,10 | 147 | BL | | 0 |
| 13 | 10 | 13,10 | 148 | BL | | 0 |
| 14 | 10 | 14,10 | 149 | NP | NP | 0 |
| 15 | 10 | 15,10 | 150 | NP | NP | 0 |
| 1 | 11 | 1,11 | 151 | NP | NP | 0 |
| 2 | 11 | 2,11 | 152 | NP | NP | 0 |

Figure 17e

| | | | | | | |
|---|---|---|---|---|---|---|
| 3 | 11 | 3,11 | 153 | BL | | 0 |
| 4 | 11 | 4,11 | 154 | BL | | 0 |
| 5 | 11 | 5,11 | 155 | SPD | | 0 |
| 6 | 11 | 6,11 | 156 | BL | | 0 |
| 7 | 11 | 7,11 | 157 | BL | | 1 |
| 8 | 11 | 8,11 | 158 | BL | | 1 |
| 9 | 11 | 9,11 | 159 | BL | | 0 |
| 10 | 11 | 10,11 | 160 | BL | | 0 |
| 11 | 11 | 11,11 | 161 | | | 0 |
| 12 | 11 | 12,11 | 162 | BL | | 0 |
| 13 | 11 | 13,11 | 163 | BL | | 0 |
| 14 | 11 | 14,11 | 164 | NP | NP | 0 |
| 15 | 11 | 15,11 | 165 | NP | NP | 0 |
| 1 | 12 | 1,12 | 166 | NP | NP | 0 |
| 2 | 12 | 2,12 | 167 | NP | NP | 0 |
| 3 | 12 | 3,12 | 168 | BL | | 0 |
| 4 | 12 | 4,12 | 169 | BL | | 0 |
| 5 | 12 | 5,12 | 170 | BL | | 0 |
| 6 | 12 | 6,12 | 171 | BL | | 0 |
| 7 | 12 | 7,12 | 172 | BL | | 0 |
| 8 | 12 | 8,12 | 173 | BL | | 1 |
| 9 | 12 | 9,12 | 174 | BL | | 1 |
| 10 | 12 | 10,12 | 175 | BL | | 0 |
| 11 | 12 | 11,12 | 176 | BL | | 0 |
| 12 | 12 | 12,12 | 177 | BL | | 0 |
| 13 | 12 | 13,12 | 178 | BL | | 0 |
| 14 | 12 | 14,12 | 179 | NP | NP | 0 |
| 15 | 12 | 15,12 | 180 | NP | NP | 0 |
| 1 | 13 | 1,13 | 181 | NP | NP | 0 |
| 2 | 13 | 2,13 | 182 | NP | NP | 0 |
| 3 | 13 | 3,13 | 183 | STAD | | 1 |
| 4 | 13 | 4,13 | 184 | BL | | 0 |
| 5 | 13 | 5,13 | 185 | BL | | 0 |
| 6 | 13 | 6,13 | 186 | BL | | 0 |
| 7 | 13 | 7,13 | 187 | BL | | 0 |
| 8 | 13 | 8,13 | 188 | ST7C | | 1 |
| 9 | 13 | 9,13 | 189 | BL | | 0 |
| 10 | 13 | 10,13 | 190 | BL | | 0 |
| 11 | 13 | 11,13 | 191 | BL | | 0 |
| 12 | 13 | 12,13 | 192 | BL | | 0 |
| 13 | 13 | 13,13 | 193 | STKC | STKC | 0 |

Figure 17f

| | | | | | | |
|---|---|---|---|---|---|---|
| 14 | 13 | 14,13 | 194 | NP | NP | 0 |
| 15 | 13 | 15,13 | 195 | NP | NP | 0 |
| 1 | 14 | 1,14 | 196 | NP | NP | 0 |
| 2 | 14 | 2,14 | 197 | NP | NP | 0 |
| 3 | 14 | 3,14 | 198 | NP | NP | 0 |
| 4 | 14 | 4,14 | 199 | NP | NP | 0 |
| 5 | 14 | 5,14 | 200 | NP | NP | 0 |
| 6 | 14 | 6,14 | 201 | NP | NP | 0 |
| 7 | 14 | 7,14 | 202 | NP | NP | 0 |
| 8 | 14 | 8,14 | 203 | NP | NP | 0 |
| 9 | 14 | 9,14 | 204 | NP | NP | 0 |
| 10 | 14 | 10,14 | 205 | NP | NP | 0 |
| 11 | 14 | 11,14 | 206 | NP | NP | 0 |
| 12 | 14 | 12,14 | 207 | NP | NP | 0 |
| 13 | 14 | 13,14 | 208 | NP | NP | 0 |
| 14 | 14 | 14,14 | 209 | NP | NP | 0 |
| 15 | 14 | 15,14 | 210 | NP | NP | 0 |
| 1 | 15 | 1,15 | 211 | NP | NP | 0 |
| 2 | 15 | 2,15 | 212 | NP | NP | 0 |
| 3 | 15 | 3,15 | 213 | NP | NP | 0 |
| 4 | 15 | 4,15 | 214 | NP | NP | 0 |
| 5 | 15 | 5,15 | 215 | NP | NP | 0 |
| 6 | 15 | 6,15 | 216 | NP | NP | 0 |
| 7 | 15 | 7,15 | 217 | NP | NP | 0 |
| 8 | 15 | 8,15 | 218 | NP | NP | 0 |
| 9 | 15 | 9,15 | 219 | NP | NP | 0 |
| 10 | 15 | 10,15 | 220 | NP | NP | 0 |
| 11 | 15 | 11,15 | 221 | NP | NP | 0 |
| 12 | 15 | 12,15 | 222 | NP | NP | 0 |
| 13 | 15 | 13,15 | 223 | NP | NP | 0 |
| 14 | 15 | 14,15 | 224 | NP | NP | 0 |
| 15 | 15 | 15,15 | 225 | NP | NP | 0 |

NUMBER of CARDS PLAYED    9

Figure 19

Example logic to determine how machine will regulate and restrict gameplay:

| # | X | Y | Z | Short Descr | Deck | Ready | Reserved | Normal | Special | Dead | # | Suit | Joker |
|---|---|---|---|---|---|---|---|---|---|---|---|---|---|
| 1 | 1 | 1 | 1 | Starter, King of Clubs | N | Y | N | N | N | Y | King | Clubs | Y |
| 2 | 2 | 1 | 1 | Reserved | N | N | Y | N | N | N | some | any | Y |
| 3 | 3 | 1 | 1 | Normal | N | N | N | Y | N | N | any | any | Y |
| 4 | 4 | 1 | 1 | Normal | N | N | N | Y | N | N | any | any | Y |
| 5 | 5 | 1 | 1 | Reserved | N | N | Y | N | N | N | some | any | Y |
| 6 | 6 | 1 | 1 | Starter, 7 of Clubs | N | Y | N | N | N | N | 7 | Clubs | Y |
| 7 | 7 | 1 | 1 | Reserved | N | N | Y | N | N | N | some | any | Y |
| 8 | 8 | 1 | 1 | Normal | N | N | N | Y | N | N | any | any | Y |
| 9 | 9 | 1 | 1 | Normal | N | N | N | Y | N | N | any | any | Y |
| 10 | 10 | 1 | 1 | Reserved | N | N | Y | N | N | N | some | any | Y |
| 11 | 11 | 1 | 1 | Starter, Ace of Diamonds | N | Y | N | N | N | N | Ace | Diamond | Y |

=IF(CI36=0,CQ78,CQ79)
Result = NO

Because of machine evaluations of Node and Card DNA tables, including:

=CI31*CI32*CI33*CI34*CI35
=SUM(CS31:DX31)*CI25
=SUM(CS32:DX32)*CI26
=SUM(CS33:DX33)*CI27
=SUM(CS34:DX34)*CI28

=INDEX(EM$18:EM$150,MATCH($CI38,$EC$18:$EC$150,0))
=INDEX(EM$18:EM$150,MATCH($CI39,$EC$18:$EC$150,0))
=INDEX(EM$18:EM$150,MATCH($CI40,$EC$18:$EC$150,0))
=INDEX(EM$18:EM$150,MATCH($CI41,$EC$18:$EC$150,0))

=IF(CS37=$CI$16,0,1)
=IF(CS38=$CI$16,0,1)
=IF(CS39=$CI$16,0,1)
=IF(CS40=$CI$16,0,1)

=IF($CI$16=CS37,1,0)
=IF($CI$16=CS38,1,0)
=IF($CI$16=CS39,1,0)
=IF($CI$16=CS40,1,0)

=IF(K23=J23,0,1)
=IF(K24=J24,0,1)
=IF(K25=J25,0,1)
=IF(K26=J26,0,1)

=INDEX(EM$18:EM$150,MATCH($CI16,$EC$18:$EC$150,0))
=INDEX(EN$18:EN$150,MATCH($CI16,$EC$18:$EC$150,0))
=INDEX(EO$18:EO$150,MATCH($CI16,$EC$18:$EC$150,0))
=INDEX(EP$18:EP$150,MATCH($CI16,$EC$18:$EC$150,0))

Example logic to determine how machine will regulate and restrict points and scoring:

Figure 21

MYTHICAL VALUES

| Player | Card | Suit | Decay Rate | Myth Value | Cards Deck % of Total Cards in Deck | Hands % of Total Cards in Hands | Board % of Total Cards on Board | Board % of Board Filled | # Players | Specie Hearts Turbo (15) | Real Points | Distance | Decay Power | Perceived Point Value | Desire |
|---|---|---|---|---|---|---|---|---|---|---|---|---|---|---|---|
| Risk Taker | A | Spades | 0.8 | 30 | 50% | 30% | 20% | 40% | 2 | 100% | 15 | 1 | 0.8 | 18.75 | |
| | 2 | Spades | 0.8 | 2 | 50% | 30% | 20% | 40% | 2 | | 15 | 1 | 0.8 | 18.75 | |
| | 3 | Spades | 0.8 | 1 | 50% | 30% | 20% | 40% | 2 | | 15 | 1 | 0.8 | 18.75 | |
| | 4 | Spades | 0.8 | 0.05 | 50% | 30% | 20% | 40% | 2 | | 15 | 1 | 0.8 | 18.75 | |
| | 5 | Spades | 0.8 | 1 | 50% | 30% | 20% | 40% | 2 | | 15 | 1 | 0.8 | 18.75 | |
| | 6 | Spades | 0.8 | 2 | 50% | 30% | 20% | 40% | 2 | | 15 | 1 | 0.8 | 18.75 | |
| | 7 | Spades | 0.8 | 30 | 50% | 30% | 20% | 40% | 2 | 100% | 15 | 1 | 0.8 | 18.75 | |
| | 8 | Spades | 0.8 | 2 | 50% | 30% | 20% | 40% | 2 | | 15 | 1 | 0.8 | 18.75 | |
| | 9 | Spades | 0.8 | 1 | 50% | 30% | 20% | 40% | 2 | | 15 | 1 | 0.8 | 18.75 | |
| | 10 | Spades | 0.8 | 0.05 | 50% | 30% | 20% | 40% | 2 | | 15 | 1 | 0.8 | 18.75 | |
| | Jack | Spades | 0.8 | 1 | 50% | 30% | 20% | 40% | 2 | | 15 | 1 | 0.8 | 18.75 | |
| | Queen | Spades | 0.8 | 2 | 50% | 30% | 20% | 40% | 2 | | 15 | 1 | 0.8 | 18.75 | |
| | King | Spades | 0.8 | 30 | 50% | 30% | 20% | 40% | 2 | 100% | 15 | 1 | 0.8 | 18.75 | |
| Conservative | A | Spades | 0.8 | 0.05 | 50% | 30% | 20% | 40% | 2 | 100% | 15 | 1 | 0.8 | 18.75 | |
| | 2 | Spades | 0.8 | 1 | 50% | 30% | 20% | 40% | 2 | | 15 | 1 | 0.8 | 18.75 | |
| | 3 | Spades | 0.8 | 2 | 50% | 30% | 20% | 40% | 2 | | 15 | 1 | 0.8 | 18.75 | |
| | 4 | Spades | 0.8 | 10 | 50% | 30% | 20% | 40% | 2 | | 15 | 1 | 0.8 | 18.75 | |
| | 5 | Spades | 0.8 | 2 | 50% | 30% | 20% | 40% | 2 | | 15 | 1 | 0.8 | 18.75 | |
| | 6 | Spades | 0.8 | 1 | 50% | 30% | 20% | 40% | 2 | | 15 | 1 | 0.8 | 18.75 | |
| | 7 | Spades | 0.8 | 0.05 | 50% | 30% | 20% | 40% | 2 | 100% | 15 | 1 | 0.8 | 18.75 | |
| | 8 | Spades | 0.8 | 1 | 50% | 30% | 20% | 40% | 2 | | 15 | 1 | 0.8 | 18.75 | |
| | 9 | Spades | 0.8 | 2 | 50% | 30% | 20% | 40% | 2 | | 15 | 1 | 0.8 | 18.75 | |
| | 10 | Spades | 0.8 | 10 | 50% | 30% | 20% | 40% | 2 | | 15 | 1 | 0.8 | 18.75 | |
| | Jack | Spades | 0.8 | 1 | 50% | 30% | 20% | 40% | 2 | | 15 | 1 | 0.8 | 18.75 | |
| | Queen | Spades | 0.8 | 2 | 50% | 30% | 20% | 40% | 2 | | 15 | 1 | 0.8 | 18.75 | |
| | King | Spades | 0.8 | 0.05 | 50% | 30% | 20% | 40% | 2 | 100% | 15 | 1 | 0.8 | 18.75 | |

SYSTEM AND METHOD OF PLAYING A GAME ON AN ELECTRONIC DEVICE

CROSS-REFERENCE TO RELATED APPLICATIONS

This application is related to and claims priority from U.S. Provisional Patent Application No. 61/431,457, filed on Jan. 11, 2011, by Whitehurst, et al. titled "Electronic Game", which is incorporated herein by reference in its entirety.

BACKGROUND OF THE INVENTION

1. Statement of the Technical Field

The present invention generally relates to a system and method for playing a game on an electronic device, and more particularly, to a system and method for playing the board game SNAG-IT© on an electronic device.

2. Description of the Related Art

There are numerous electronic gaming systems and methods in use today. Such systems operate using electronic devices, such as, but not limited to, personal computers, laptop or notebook computers, mobile phones, smart phones, Personal Digital Assistants ("PDAs"), Blackberry or similar mobile devices, and the like, (hereinafter, collectively, "electronic devices").

SNAG-IT© is a board game for 2 to 6 players, using cards and tokens. The original board game is the subject of U.S. Copyright VAu 1-025-031, registered effective date Jul. 9, 2008.

The objective of SNAG-IT© is to "snag" the most points to win. Players who use their Smarts and Strategy most effectively will Snag the most points. The SNAG-IT© board game requires the following equipment: Game Board, Playing Cards, Scoring Tokens, and Instructions. As depicted in FIG. 1, The SNAG-IT© game board includes the following features: Starter Spaces (highlighted Ace, 7, King of each Suit on the board), Reserved Spaces (Spaces adjacent to Starter Spaces), Special Spaces (highlighted by a Suit without denomination, for a Super or Turbo Snag-it), Deck Space (the space in the middle of the board where the deck sits) and Unplayable Spaces (the Spaces adjacent to the deck).

SNAG-IT© game play proceeds generally as follows:
1. Each player is dealt 12 cards.
2. The remaining cards are placed face down in the center of the board.
3. Player turns move clockwise beginning from the dealer.
4. A "Play" is made by a player placing one or more cards face up on different Spaces on the board.
5. The first card in the game must be played on a Starter Space.
6. All subsequent plays must either be on a Starter Space, or adjacent to a previously played card.
7. A player who cannot play must draw a card from the deck.
8. Players "Snag" Spaces by placing tokens on the board where they have scored points.
9. The game ends the first time a player has played all their cards on the board.
10. The winner is the player with the most points.

SNAG-IT© game rules include: cards may be played on Starter Spaces and/or Spaces adjacent to previously played cards, and cards of equal value and the same suit cannot be played next to each other. FIG. 2 provides some examples of prohibited plays.

A card of equal value in a different suit, or a sequential value in the same suit may be played adjacently. Aces are both high and low, and can be played next to other Aces, Kings or 2's. FIG. 3 provides some examples of cards that may be played adjacent to each other.

Additional rules include:
1. Reserved Spaces (adjacent to Starter Spaces) can only be played if a card has previously been played in an adjacent Starter Space.
2. When a player has one card left, they must declare "last card".
3. The player who ends the game by playing all their cards first wins bonus points.
4. When the game ends, all other players may play one last card from their hand, to reduce their un-played card penalty. If they cannot play a card, they do not have to draw a card.

Jokers are considered "wild" cards. To use a Joker, a player places it on the board and declares its suit and value, e.g. "3 of Clubs" or "King of Hearts". Jokers can be played as typical cards on starter spaces, or adjacent to previously played cards, but cannot be played on special spaces. Once played, a Joker remains as that card suit and value while on the board. Also, Jokers can be used to gain Snag-it points. If a Joker is on the board and a player has the actual card that the Joker represents in their hand, they may use their turn to exchange the card in your hand for the Joker on the board.

In SNAG-IT©, players gain points by capturing un-played spaces on the board so no other player can play any cards there. When a player captures a space, they "Snag-it" by placing tokens in the spaces according to how many points the space is worth. It is possible to snag multiple adjacent spaces simultaneously. FIG. 4 provides some examples of allowable plays to capture various spaces.

At game end, points are awarded and a penalty assessed as follows:

+15 points for each Turbo Snag-it: Ace, 7, or King of same-suit card on a special scoring space.

+5 points for each Super Snag-it: any other same-suit card on a special scoring space.

+1 point for each Classic Snag-It: any other Snag-it elsewhere on the board.

+5 points for being the first player to get rid of all their cards.

−5 points for each A, 7, K or Joker still in your hand when the game ends.

−1 point each for any other cards still in your hand when the game ends.

The board game version of SNAG-IT© requires the use of a physical game board and the placement of cards and tokens on the physical board by the various human players. A typical game of SNAG-IT© may involve the use of 2 or more decks of cards, generally determined by the number of players. Thus, there is a need for an electronic version of the SNAG-IT© game which provides for electronic play without the need for the physical game components required by the board game version, and which also allows for one or more computerized players, with dynamically changing criteria, such as the number of cards per player.

SUMMARY OF THE INVENTION

An aspect of the present invention provides a system, method and device for playing an electronic game on an electronic device. The device includes an electronic circuit, an input device and a display, and may be connected to a remote player via the Internet over a communications interface. The method includes receiving a selection of the number and location of human players, the number of computer players and the number of decks for the game, a selection of the personality type and urges for each computer player; by the electronic circuit. Next, the cards are electronically shuffled and each player is dealt a predetermined number of cards, typically 12 cards. An electronic game board is generated and displayed, and the electronic circuit provides each player a game turn in succession, validating or rejecting each move along the way, until a game ending event occurs. In an implementation of the invention, the electronic game is SNAG-IT©.

Personality type is selected from the list including Conservative, Random, Risk Taker, Defender, Long term Strategy, Go for the Gold, Self Defense, Opponent Blocker and Oblivious.

Urges are selected from the list comprising: the Two-Pointer, the Three Pointer, the Turbo Pointer, the Super Pointer, the starter Discarder, and the Joker Hoarder.

Another aspect of the invention includes highlighting on the display game board by the electronic circuit, locations where a human selected card may be played.

In another aspect of the invention, the electronic circuit uses an artificial intelligence (AI) process to determine the computer player's game moves, in which the AI is affected by the selected player personality, urge(s), and other game factors selected from the list including: game progress, known value of other player cards, values of cards in hand, probability opponent will prevent needed future move. In a further aspect of the invention, a computer player's personality and urge(s) may change during a game based on game experience.

BRIEF DESCRIPTION OF THE DRAWINGS

Embodiments will be described with reference to the following drawing figures, in which like numerals represent like items throughout the figures, and in which:

FIG. 3 is a prior art depiction of exemplary legal SNAG-IT© moves.

FIG. 4 is a prior art depiction of legal SNAG-IT© moves to capture spaces.

Figure 7:
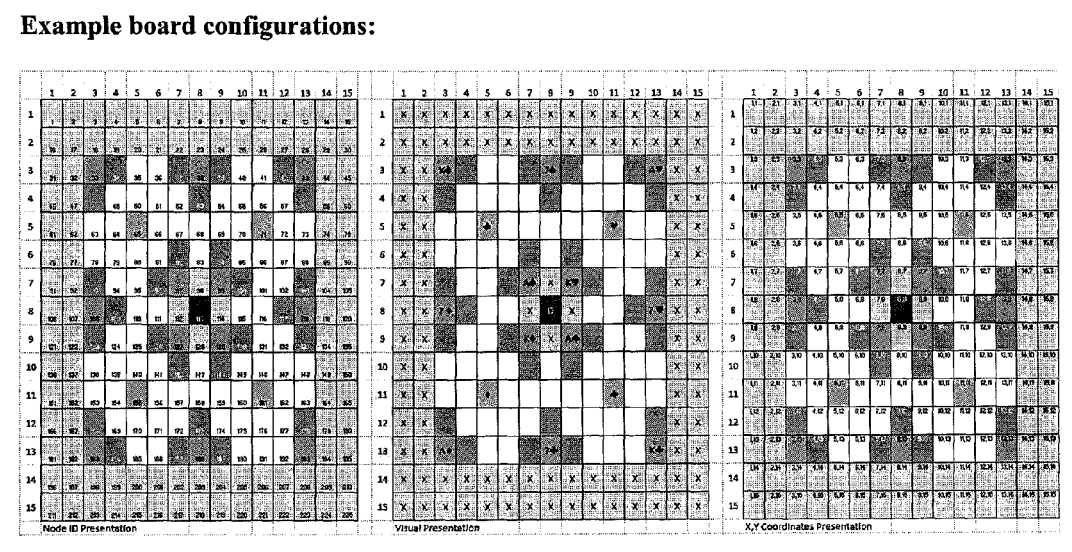

FIG. 7 is a depiction of several exemplary electronic SNAG-IT© game board configurations that are useful for understanding the present invention.

FIG. 9 is a depiction of an exemplary electronic SNAG-IT© game board configuration showing various data for use in understanding the present invention.

FIG. 12a depicts several flow diagrams of exemplary AI opponent play that is useful for understanding the present invention.

FIG. 12c depicts several flow diagrams of exemplary AI opponent play that is useful for understanding the present invention.

FIG. 12d depicts several flow diagrams of exemplary AI opponent play that is useful for understanding the present invention.

FIG. 13 is a table of supporting logic for making AI decisions that is useful for understanding the present invention.

FIG. 16 is a flow diagram of an exemplary method for scanning for points that is useful for understanding the present invention.

FIG. 17a is an exemplary table displaying data used in an electronic SNAG-IT© game that is useful for understanding the present invention.

FIG. 17b is a continuation of an exemplary table displaying data used in an electronic SNAG-IT© game that is useful for understanding the present invention.

FIG. 17c is a continuation of an exemplary table displaying data used in an electronic SNAG-IT© game that is useful for understanding the present invention.

FIG. 17d is a continuation of an exemplary table displaying data used in an electronic SNAG-IT© game that is useful for understanding the present invention.

FIG. 17e is a continuation of an exemplary table displaying data used in an electronic SNAG-IT© game that is useful for understanding the present invention.

FIG. 17f is a continuation of an exemplary table displaying data used in an electronic SNAG-IT© game that is useful for understanding the present invention.

FIG. 19 is a table and sample logic coding used for a method for determining how the machine will regulate and restrict game play exemplary electronic game of SNAG-IT© that is useful for understanding the present invention.

FIG. 21 is a table presenting exemplary mythical values that is useful for understanding the present invention.

DETAILED DESCRIPTION

Figure 1:
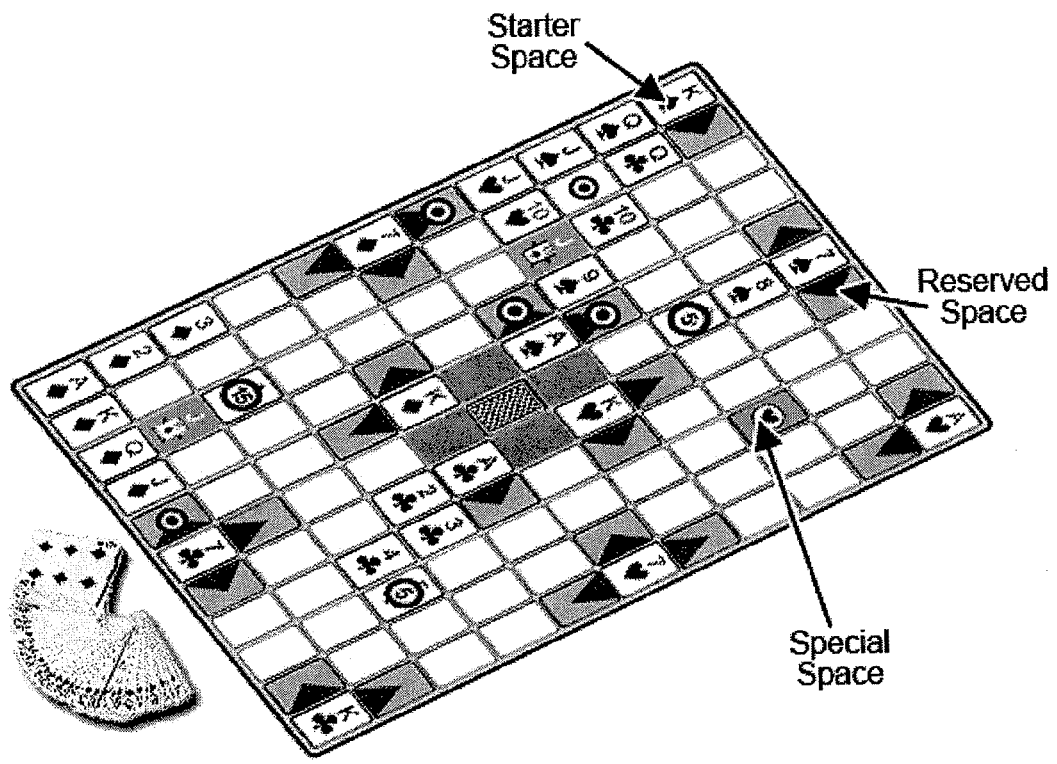
FIG. 1 is a prior art depiction of an exemplary SNAG-IT© physical game board and card deck.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for advantageously providing an electronic version of the SNAG-IT© game which provides for electronic play without the need for the physical game components required by the board game version, and which also allows for one or more computerized players. Also advantageously provided are systems and methods for a computer opponent exhibiting features relevant to SNAG-IT© game-play strategy as well as to other computerized games involving similar strategic considerations.

Although a description of the present invention uses a mobile communications device, it is understood that other devices may be employed. In addition, more than one human player may participate in a single electronic SNAG-IT© game, and multiple players may employ the same or different electronic devices.

Method embodiments of the present invention generally involve an electronic circuit configured to operate one or more a computer opponent using processes that mimic human game play and incorporate concepts such as personality and urges.

The present invention may be implemented using any of a variety of system configurations. For example, a single human player may play the computerized game on a single device with one or more computer opponent(s). Alternatively, multiple human players may play against each other and/or one or more computer opponent(s), either using a single device or on multiple devices utilizing a computer network, such as the Internet, configured with appropriate software to manage game-play, without limitation. An exemplary implementing system embodiment of the present invention will be described below in relation to FIG. 5. Exemplary method embodiments of the present invention will be described below in relation to FIGS. 6-20.

Exemplary Systems Implementing the Present Invention

Figure 5:
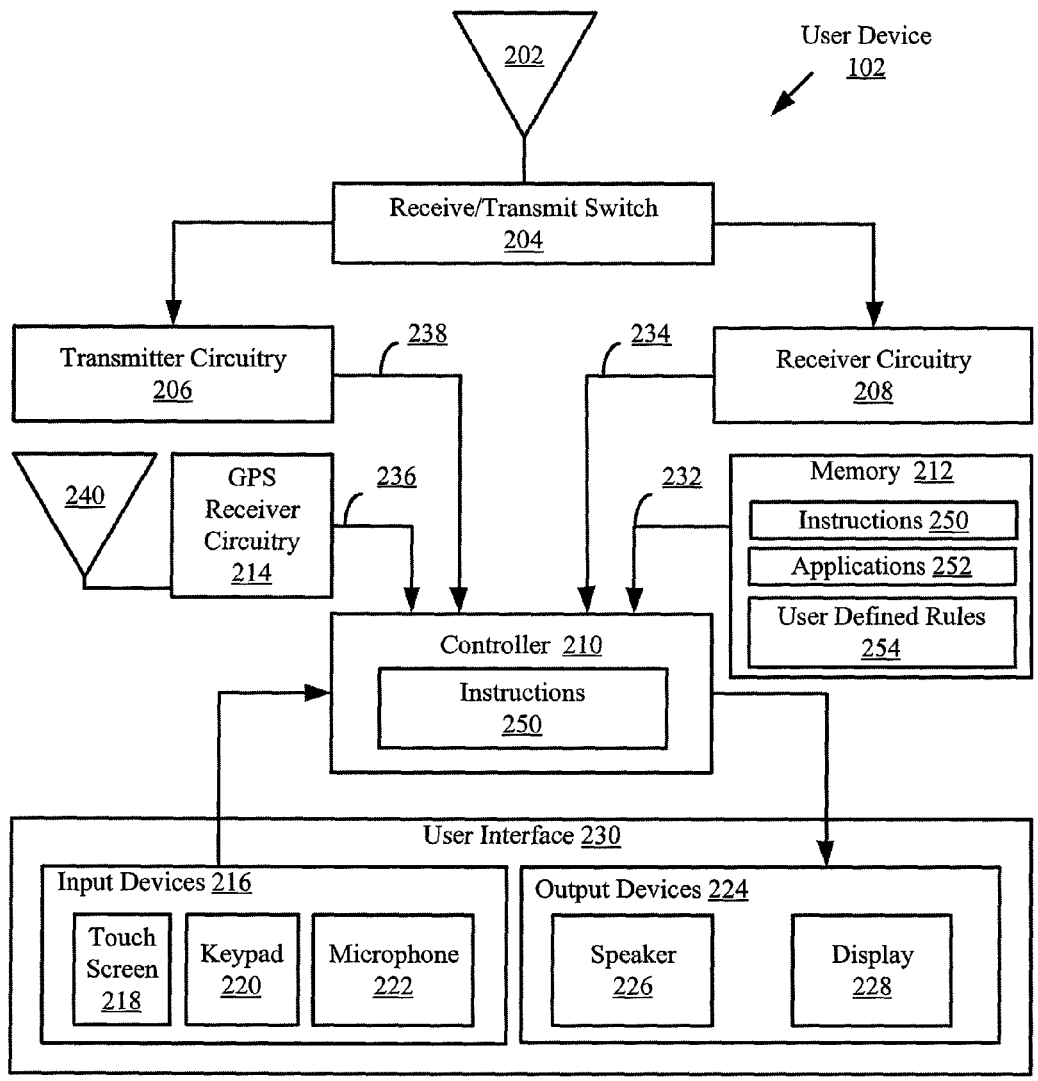
FIG. 5 is a schematic diagram of an exemplary electronic device that is useful for understanding the present invention.
Figure 6:
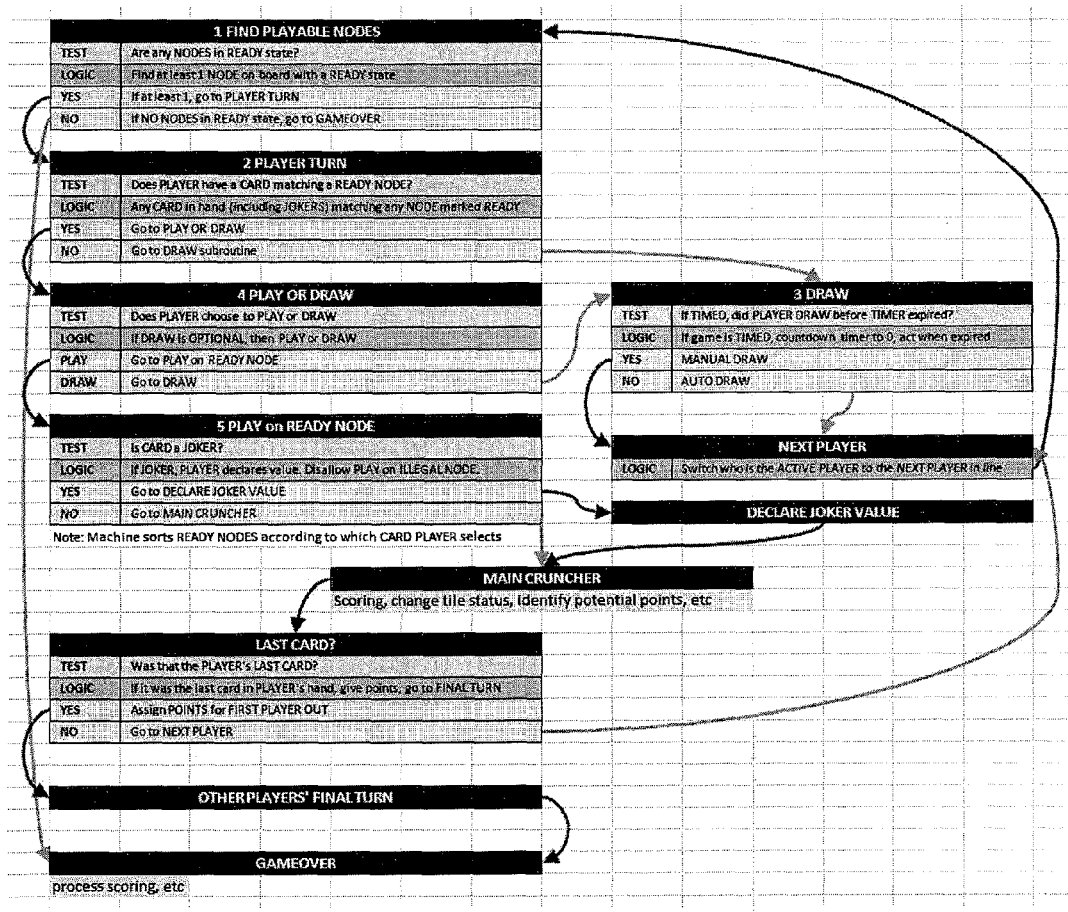
FIG. 6 is a flow diagram of an exemplary method for machine logic or AI that is useful for understanding the present invention.
Figure 8:
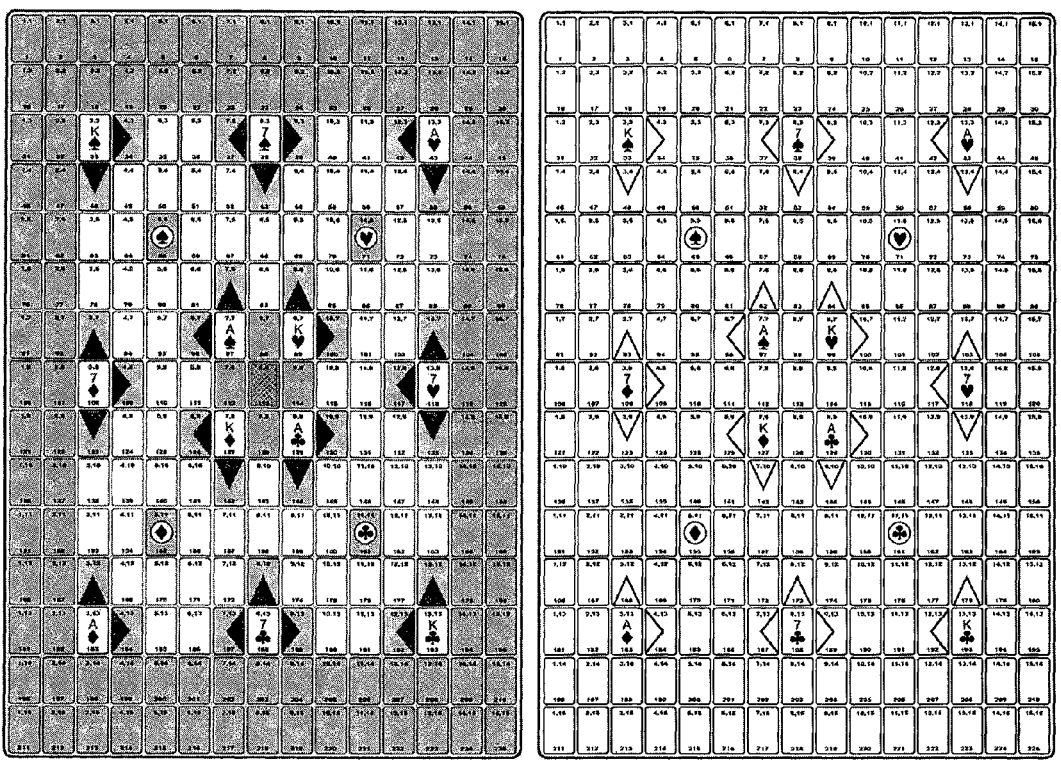
FIG. 8 is a depiction of exemplary hybrid board visualizations that are useful for understanding the present invention.

Referring now to FIG. 5, there is provided a more detailed block diagram of an exemplary user device 102. The user device 102 will be described herein as comprising a mobile phone or a smart phone. However, the present invention is not limited in this regard. For example, the user device can alternatively comprise a notebook or laptop computer, a PDA, a tablet Personal Computer ("PC"), or the like.

Figure 2:
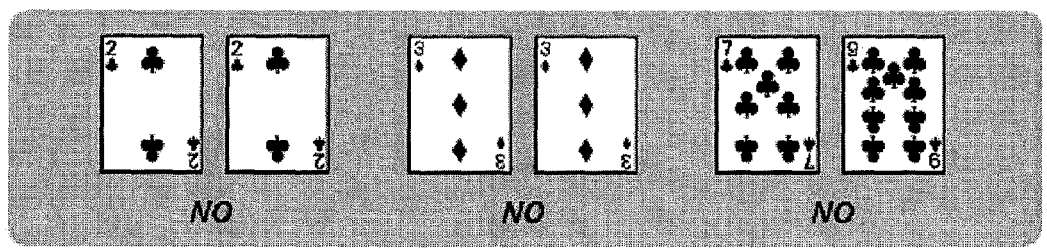
FIG. 2 is a prior art depiction of exemplary illegal SNAG-IT© moves.

Notably, the user device 102 can include more or less components than those shown in FIG. 2. For example, the user device 102 may include a wired system interface, such as a universal serial bus interface (not shown in FIG. 5). However, the components shown are sufficient to disclose an illustrative embodiment. The hardware architecture of FIG. 5 represents one embodiment of a representative user device configured to facilitate the playing of SNAGIT©. In this regard, the user device of FIG. 5 implements a method playing of SNAGIT© for use by the user of user device 102. Exemplary embodiments of the various methods will be described below in relation to FIGS. 6-20.

As shown in FIG. 5, the user device 102 may also comprise an antenna 202 for receiving and transmitting Radio Frequency (RF) signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from a network (not depicted in FIG. 5) to derive information therefrom. The receiver circuitry 208 is coupled to a controller 210 via an electrical connection 234. The receiver circuitry 208 provides the decoded RF signal information to the controller 210. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (not depicted in FIG. 5). Antenna 202 and receiver/transmitter components 204, 206 and 208 are not required for implementations of the invention which use a single user device 102 not connected to a server or network (not depicted).

The controller 210 stores the decoded RF signal information in a memory 212 of the user device 102. Accordingly, the memory 212 is connected to and accessible by the controller 210 through an electrical connection 232. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein the software applications 252 for implementing the methods of embodiments of the invention as well as user-defined rules 254.

The software applications 252 may include, but are not limited to, applications operative to perform the various methods described herein, as well as other applications, without limitation.

As shown in FIG. 2, one or more sets of instructions 250 are stored in the memory 212. The instructions 250 can also reside, completely or at least partially, within the controller 210 during execution thereof by the communication device 102. In this regard, the memory 212 and the controller 210 can constitute machine-readable media. The term "machine-readable media", as used here, refers to a single non-transient medium or multiple non-transient media that store the one or more sets of instructions 250. The term "machine-readable media", as used here, also refers to any medium that is capable of storing, encoding or carrying the set of instructions 250 for execution by the communication device 102 and that cause the communication device 102 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications 252 installed on the computing device 102. Such input and output devices may respectively include, but are not limited to, a display 228, a speaker 226, a keypad 220, a microphone 222, and touch screen 218. The input and output devices may include less, more, or different devices including a directional pad, a directional knob, a Push-To-Talk ("PTT") button, sensors, a camera and a Radio Frequency Identification ("RFID")/Near Field Communication ("NFC") reader.

As noted above, the system implements methods for controlling functions of software applications based on a location and/or an activity of a person or mobile object. Exemplary embodiments of such methods will now be described in relation to FIGS. 6-_.

Exemplary Methods of the Present Invention

In an implementation of the invention, there is provided an electronic SNAG-IT© game, which can be played by single or multiple players. The game may be played on a computer or other user device 102 having a display screen and at least means for a human player to input data, such as a keyboard and/or pointer device or touch screen. Players can be either human or machine, or any mixed combination. The game will keep track of and regulate legal or illegal plays, scoring, strategy, networking, game history data, leader boards and artificial intelligence.

Logically, in an implementation, the game board is represented in the computer memory and consists of a plurality of nodes organized in the electronic memory of a device including at least one computer processor, associated electronic memory and one or more input device(s). The electronic device preferably includes a display screen operably connected to the at least one processor. The processor and associated memory together form an electronic circuit for executing the inventive methods. The various methods described herein are enabled and instantiated using said electronic circuit, together with input and display devices, as needed. The electronic game can be played either on a XY grid of nodes in 2D space, or an XYZ grid of nodes in 3D space. The electronic game board can be on any number of display devices including TV or computer screens, as well as those of cell phones or other mobile devices such as iPad or Tablet computers, touch-screens or other devices such as 3D televisions. Nodes can be categorized into a multitude of different designations, including starting nodes, scoring nodes, deck nodes and non-playable nodes. The game board visible to humans may be different in layout and node designation than the board in machine memory.

In an embodiment of the invention, the electronic game of SNAG-IT© can be played with cards of multiple suits and values and decks, including special wildcards such as jokers and other designations. A game may initiated by a human player, who uses the device 102 to select the number and identity of human players, the number and type of card deck to use, as well as other operating parameters, as wee understood in the electronic gaming arts. The human player may also select to have zero, one or more computer opponent.

If no computer opponent is selected, the game is then configured to proceed as a game between two or more human players. Certain computerized game features are still usable in this type of game, such as automatic highlighting of potential moves on the game board for each card. Additionally, a game may also be configured to provide for one or more human players to participate remotely, such as over the Internet, using connectivity hardware and software as is well known in the computer arts. Such implementations are envisioned in the present invention.

The game begins when the electronic device 102, a.k.a. the "machine", prepares the board, shuffles the deck(s) and distributes a number of cards to each player. The rest of the cards are kept by the machine in the draw pile. Players play turn by turn. During a turn, a player places a card on the board or takes a card from the draw pile. Play ends if a player places their last card on the board. Play may also end depending upon circumstances which the machine may calculate, before a player has placed their last card on the board. The machine tabulates all scoring data and leader boards continuously during game play and also at the conclusion of the game. Reference herein to the machine, the AI, the computer opponent or the electronic device as performing a method step or process is understood to refer to the configuration of an electronic circuit of the electronic device 102 to actually perform the stated method step or process.

The electronic circuit is configured to enforce several rules during game play. In an implementation, these include:

1. The machine may regulate or restrict the first play of a game to an unoccupied starting node.

2. In subsequent plays, the machine may regulate or restrict cards to be placed either on another starting node, on another card, or on a node adjacent to an existing, or occupied, node on the board, subject to the machines regulation of rules/restrictions.

3. The machine may regulate or restrict adjacent placements to be either the same card value in a different suit or the next card in sequence (up or down) in the same suit, or the same suit and same value if played on top of an existing card.

4. The machine may regulate or restrict high/low card pivot points, for example—"J Q K A 2 3 4" in the same suit, where the A (Ace) is the pivot point.

5. The machine may regulate or restrict if and when a player cannot place a card on the board, if they may choose not to play, and when they must draw a card.

In one implementation of the invention. The machine establishes regulated node descriptors. Nodes may simultaneously have as few as none, and as many as all descriptors, which are machine regulated and not necessarily observable by humans. Some node descriptors may only exist in time for a micro-second before their designation may be changed to a different set of descriptors as the machine is regulating their status. Various exemplary node descriptors are described herein. Example node descriptiors include: Unoccupied, Occupied, Starting, Ready, Reserved, Dead, Potential Point, Stranded, and Special Scoring.

An Unoccupied node is any node that does not contain a card. An Occupied node may be one that has a real card occupying that node, including jokers. Note that an empty starting node position is not considered to be occupied. Cards may not be placed adjacent to a starting node unless it is occupied by a real card. However, points can be made by creating a dead node adjacent to either an occupied or unoccupied starting node, as described below.

A Starting node may be one that is predefined on the board as one of the nodes on which a card of a specific value and suit may be played. In the beginning of the game, such a node may be considered unoccupied but may be reserved for placement of only one specific card. In the standard board layout, there may be 12 starting nodes, defined for example as the Ace, 7 and King of each of 4 suits.

A ready node may be one that is unoccupied but may be ready to receive a card in a legal placement, for example—a starting node or a node adjacent to an occupied node.

Each card may carry with it a set of restrictions that define which other cards may be placed on it or next to it. This set of restrictions may be referred to as the card's DNA, with an example of use being TOP or ADJACENT matching DNA. For any given card there may be only 5 other cards that comply with this set of restrictions. When a card is placed on a ready node, the adjacent nodes may become reserved for one of those 5 other cards—i.e., the node becomes a Reserved node. The nature of reserved nodes may change depending on which card is occupying the adjacent node. Note that a joker that occupies a node position may reserve the adjacent nodes in the same way as the card that the joker represents—see joker rules.

A node may be considered Dead if there is no card that can be placed on that node that can conform to the basic machine rules of the game stated above. There may be different types of dead nodes, including those that surround the playing board, the nodes in the center of the board—the board center, and between four of the starting nodes in the board center—those that are created during play, and those that contain scoring tokens. For example, dead nodes may be created during play in different ways. Examples include:

1. When on placing a card in a ready node, two occupied nodes created that are separated by one unoccupied node and no cards may be placed in the empty node that may allow a legal sequence or match of three legal matching values, i.e., different suits, then the unoccupied node may be considered dead and the player who places such a card receives a score for each node that becomes unplayable. A scoring token is then placed in that node.

2. Whenever two diagonally occupied nodes—e.g., corners touching—cannot be connected according to the rules defined above, then both of the two nodes adjacent to the two occupied nodes may be considered dead and the player who places such a card receives a score that is indicated by placing scoring tokens in those dead nodes.

A Potential Point node may exist whenever two adjacent occupied nodes are separated by two unoccupied nodes, e.g., ready/reserved nodes. Legal placement of a card on either of the reserved nodes may render the other node unplayable or dead if it would be impossible to subsequently connect these occupied nodes according to the two basic rules of the game.

Another potential point situation may occur when two occupied nodes have a relationship to each other that resembles the two corners of a 2×3 matrix in 2D space. The reserved nodes associated with such an arrangement may or may not be incompatible, but the potential for creating dead nodes is possible.

If a node becomes surrounded by 4 adjacent dead nodes, it may be considered Stranded if no cards can be played on such a node. The player who creates such a situation receives additional score for the stranded node. The unmarked nodes surrounding the playing board may be considered dead and may be counted as one or more of the surrounding dead nodes that create a stranded node.

There may be Special Scoring nodes on the board, e.g., one of each suit. The positions of these nodes may be predefined on the playing board and in the beginning of the game may be unoccupied. When a card is placed on one of these nodes a player may receive special points if the card placed is of the same suit as that indicated on the special scoring node. If the card is of the same suit but not the same value as a starting card, the player may receive additional score. If the card is one of the starting cards of that suit, the player may receive even more addition score.

The machine may regulate or restrict Jokers or Wildcards which may be used as a substitute for any card and may be placed on any unoccupied node except jokers may not be played on the special scoring nodes. The player of the Joker must declare which card the Joker is supposed to represent and it may remain as that card until it is exchanged (see below) or until the end of the game.

If a player has the card that a Joker on the board represents, that player may exchange the real card for the Joker on the board during that players turn, and take the Joker into their hand. The joker may then be used by that player at a later time.

The machine may regular or restrict how the game is scored. The machine may also track all historical game data, which in turn may supplement the games Artificial Intelligence, so that the machine may be allowed to include new personality types in the future, in order to create a wider variety of novice or expert players, or to allow the machine to suggest gameplay strategies for humans. The following are examples of scoring descriptors.

1. Classic—If on placing a card on the board, an adjacent node becomes no longer playable, the player receives a score for each node that becomes non-playable (dead) when the card is placed.

2. Super—If a card is placed on one of the special scoring positions the player receives a score if the card placed is of the same suit as indicated on the special scoring position.

3. Turbo—If the card placed is the same as one of the indicated starting positions and is of the same suit as indicated on the special scoring position, the player receives a score.

4. First Out—The first player to place all of their cards on the board receives a score.

5. Penalties—Players who have cards remaining in their hands at the end of the game must subtract score for each normal card and additional score for other types of cards.

Points and scoring may be indicated by placing scoring tokens on the newly created dead nodes, on the occupied special scoring nodes and on the node signifying the first out card placement, as appropriate.

In a preferred embodiment of the invention, the machine is configured to provide one or more computer opponents whose game play is controlled with some degrees of artificial intelligence (AI). The AI may be incorporate different methodologies based on different kinds of players and/or strategy—represented herein as different "descriptors". Data may be tracked to study or determine the effectiveness of different types of intelligence, players or strategies, and subsequent games may include new simulations of intelligence, players or strategies in an ever evolving distribution of game configurations, including for example—different board layouts, types of decks, numbers of players, and node descriptors.

Some descriptors for the computer opponent, or virtual players, and their strategies may be designated as Personality Types and Urges. Personality Types may, for example, be defined by the % chance that a player will try to fulfill an Urge, and how that probability will change over time as the game mechanics evolve during one game, and continue to evolve over multiple games.

Examples of Urges include:
1. The One Pointer—This AI urge tries to make matches of at least 1 point.
2. The Two Pointer—This AI urge tries to make matches of at least 2 points.
3. The Three Pointer—This AI urge tries to make matches of at least 3 points.
4. The Turbo Pointer—This AI urge tries to make a Turbo.
5. The Super Pointer—This AI urge tries to make a Super.
6. The Starter Discarder—This AI urge primarily tries to discard his Starter Cards so he has no high value penalties in the end.
7. The Joker Hoarder—This AI urge looks for opportunities to swap and collect jokers.

Examples of Personality Types include:
1. The Conservative—Just goes for a few points, tries to get rid of starter cards.
2. The Randomizer—No rhyme or reason for doing anything. It's random every time.
3. The Connector—Tries to get Turbo Points.

In an implementation, an AI Personality Type may be a more complicated mixture of the personalities, which may even change over time. A player might begin as a "Connector"—someone who tries to get a Turbo, but only as long as there are opportunities to do so. Thus, at the start of the game, they would look for Turbos, but as the game goes on, they might transition to looking for single or double points, and try to dump their Starters. That Connector behavior might be illustrated in a transition from beginning to end of game as follows:

Early Game:
1. The One Pointer=0%
2. The Two Pointer=5%
3. The Three Pointer=5%
4. The Turbo Pointer=20%
5. The Super Pointer=70%
6. The Starter Discarder=0%
7. The Joker Hoarder=0%

Mid Game:
1. The One Pointer=5%
2. The Two Pointer=5%
3. The Three Pointer=10%
4. The Turbo Pointer=15%
5. The Super Pointer=55%
6. The Starter Discarder=5%
7. The Joker Hoarder=5%

End Game:
1. The One Pointer=15%
2. The Two Pointer=25%
3. The Three Pointer=30%
4. The Turbo Pointer=0%
5. The Super Pointer=0%
6. The Starter Discarder=25%
7. The Joker Hoarder=5%

Figure 10:
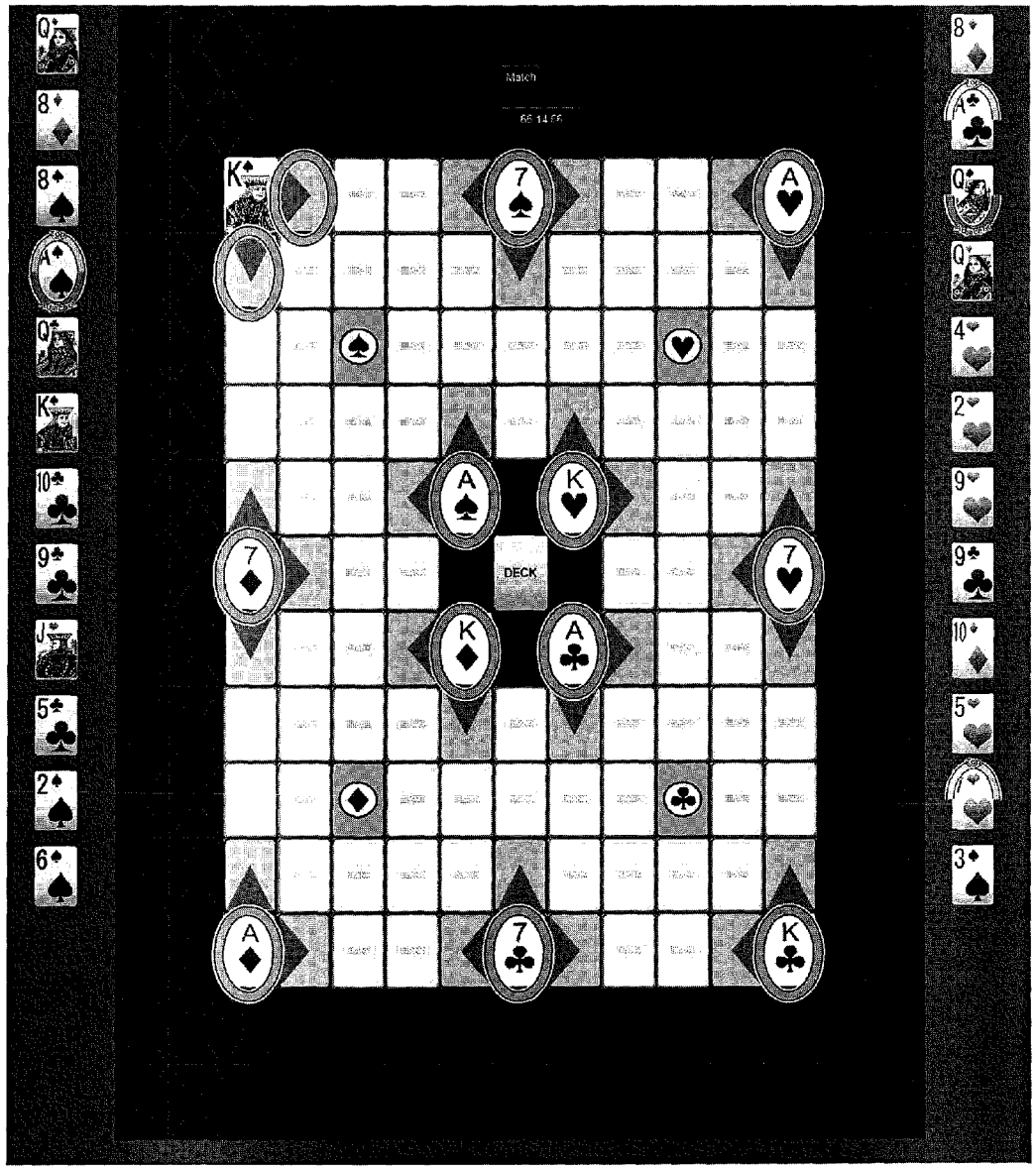
FIG. 10 is a depiction of highlighting various possible moves in a SNAG-IT© player turn that is useful for understanding the present invention.
Figure 11:
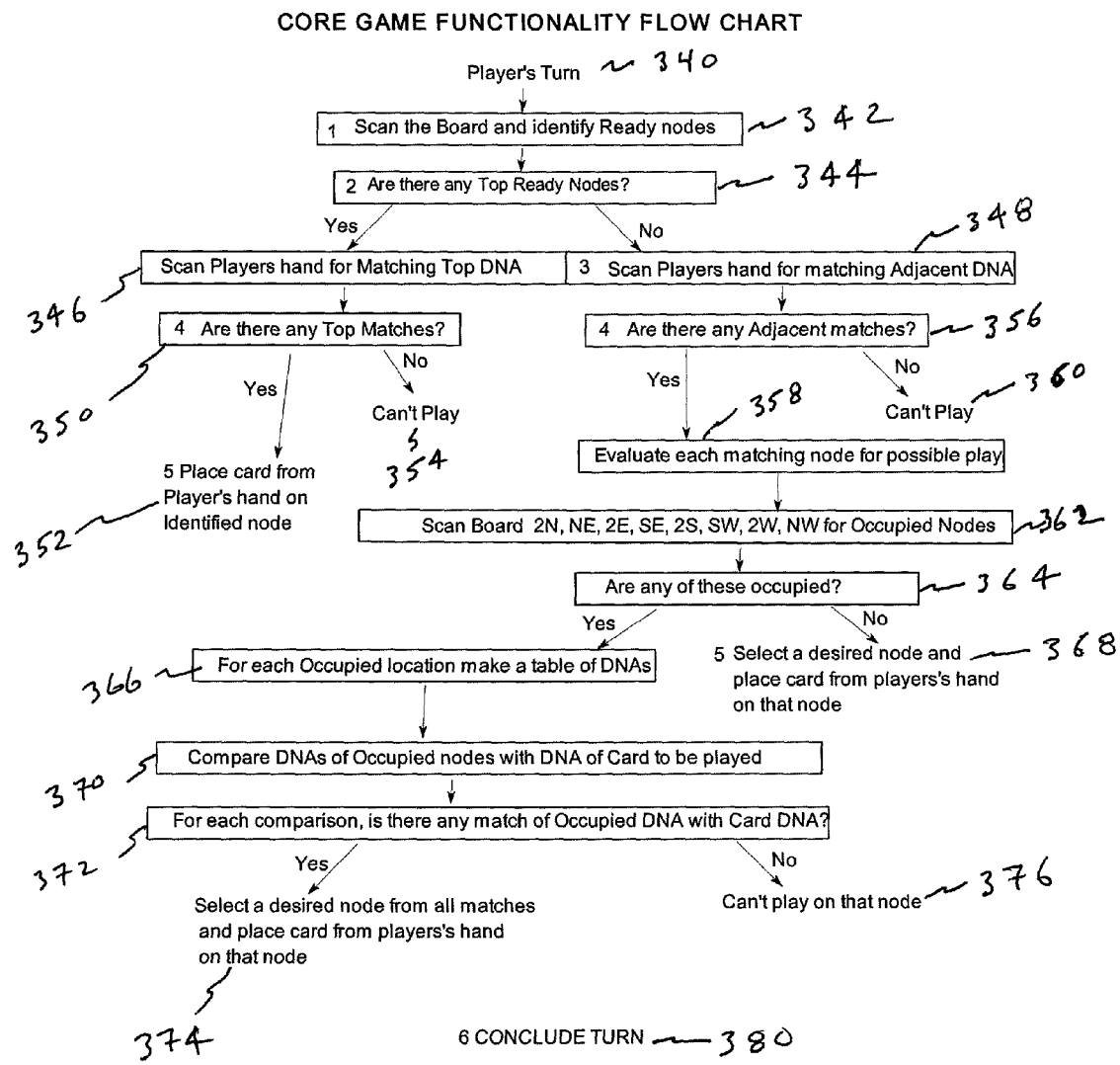
FIG. 11 is a flow diagram of an exemplary method for executing core game functionality for a computer player that is useful for understanding the present invention.
Figure 12B:
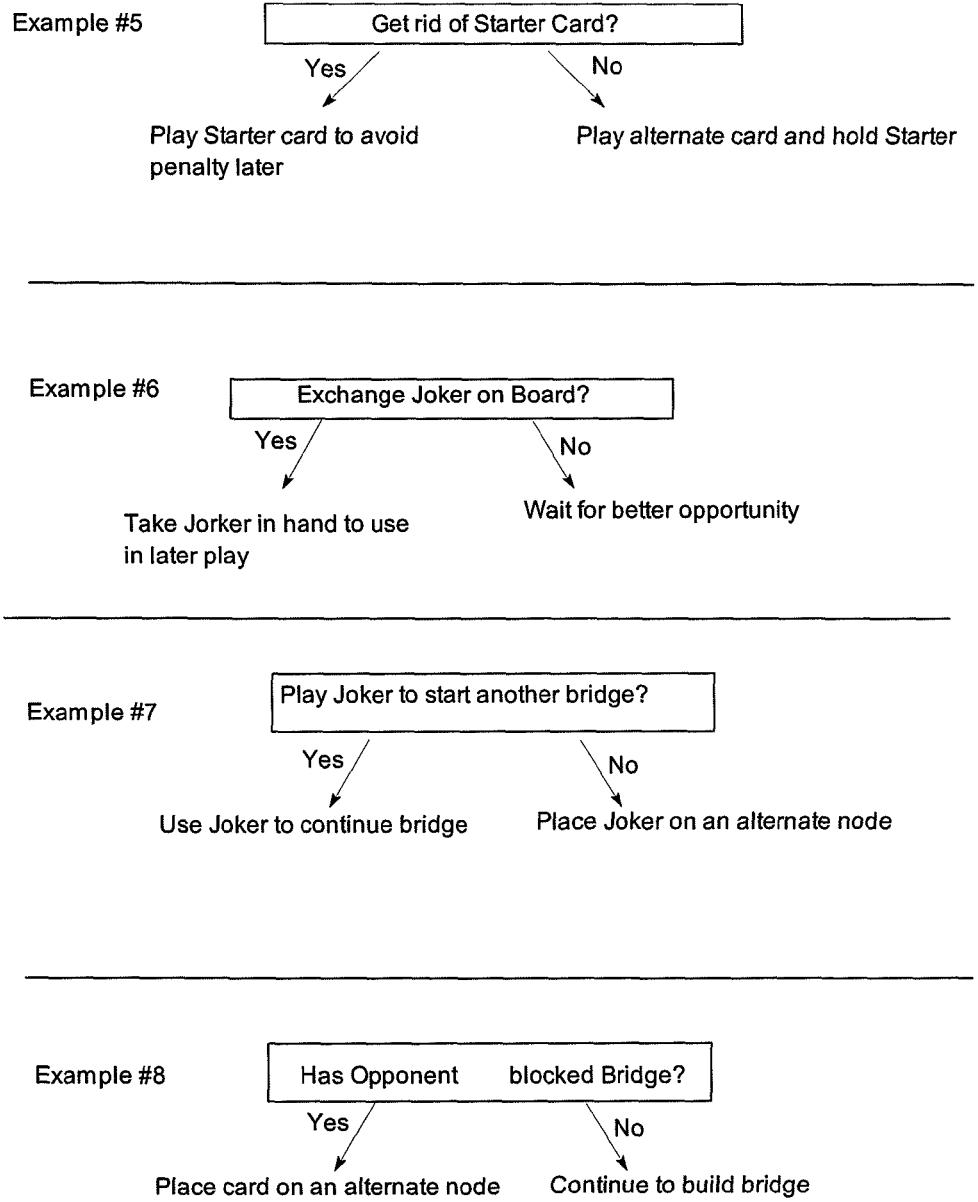
FIG. 12b depicts several flow diagrams of exemplary AI opponent play that is useful for understanding the present invention.

Aspects of the core game functionality for a computer opponent is depicted in FIGS. 10 and 11. For a given computer player's turn 340, the game board is scanned 343 to identify all Ready nodes. Ready nodes are evaluated to identify 344 legal placement using the concepts of TOP and ADJACENT Matching DNA. "DNA" as used herein refers to a node or playing card's full description, including suit, value and special characteristics, e.g., wildcard. In this process, Ready Nodes are determined from game data, which may be stored in an XML data format, and the method includes keeping track of which Nodes are Ready.

Next, if a top Ready node exists, the player's hand is scanned for top matching DNA 346. If there are any top matches 348, a card is placed from the player's hand on the identified node 352. If not, then no card is played 354. Otherwise, if there are no top Ready nodes, the player's hand is scanned 348 for matching adjacent DNA. If there are any Adjacent matches 356, each matching node is evaluated for possible play 358, otherwise, no play can be made 360, and the player must draw another card.

To evaluate each matching node, the board is scanned for occupied nodes in the 2N, NE, 2E, SE, 2S, SW, 2W and NW positions 362 relative to each matching node position. Note that relative positions used herein are referred to by relative compass direction with respect to the game board with N being up, S being down, w being left and E being right. Thus, "2N" refers to 2 nodes to the north or up. Evaluation continues with the determination if any of these nodes are occupied 364. If not, a desired node is selected and a card is placed from the player's hand on that node 368. Decision as to the card to place may be determined by calculation of the highest potential value of card placement.

For each occupied node, a table of DNAs is produced 366, and the DNA of the occupied node is compared with the DNA of the card to be played 370. For each such comparison, if there is not any match of occupied DNA with card DNA 372, then the node cannot be played 376. Otherwise, select a desired node from all the matches and place a card from the player's hand on that node 374. Again, the card to place may be determined by the highest value card placement. The turn is then concluded 380.

In one mode of gameplay, when a human player prepares to play a card, they may click (or tap, or select depending on the input device in use) on a highlighted card in their hand, indicating their choice of which card they want to play. In response, the machine may highlight the possible nodes on the game board at which the highlighted card may be played. Only Ready nodes would then be highlighted on the board with any other highlighting removed from other nodes. For example, when the human player clicks on a card to play, the device 102 filters highlighted Ready nodes, so only the nodes with a matching Top or Adjacent DNA for this card remain highlighted. In an alternate gameplay mode, the computer does not highlight the cards or nodes to indicate valid moves, therefore the player must determine valid moves on their own. In such a gameplay mode, where the computer may not visually indicate whether a play is valid (by highlighting cards or nodes) before the play is attempted, the computer must still indicate to the player an invalid move after the player has attempted it. Validity is based on the rules described above.

Once the selected card is placed on the chosen READY node, the node is then expired so it is no longer considered Ready. Next, program awards any points, scans for stranded nodes, awards any further points for stranded nodes, and promotes any applicable Adjacent nodes to Ready.

FIGS. 12a, 12b, 12c and 12d present exemplary general considerations and processes used by the inventive AI methods in game play. The decisions made by computer opponents may be influenced by many dynamically changing factors, such as, but not limited to, game age, number of players, card counting factors, node counting factors, path finding, urges, and player personalities.

A computer opponent may alter decisions based on game age. For example, the AI may assess if the game is in an early, middle or late stage, determine the number of cards still in the deck, determine the number of cards still in players' hands, determine the percentage of cards placed on the game board compared with the total number of cards, and/or determine the percentage of the game board that is filled by comparing the number of cards on the board with the number of nodes on the board.

The AI may also base AI decisions on the number of players by determining how many players there are and determining how likely it is that each player can play. Higher number of players makes it less likely a single player can control bridging from one node to the next.

A computer opponent may also alter decisions based on information available with respect to educated decisions based on the observable state of the board and which cards are visible—i.e., available for each player to view. They can also make decisions based on what cannot be directly seen, yet deductively reasoned, such as how many cards are unplayed and how many cards still in the deck. Also, the AI may assess the general probability of what cards will be in other players' hands as well as what cards will be in deck.

A computer opponent may make educated decisions based on the observable state of the boards and available versus occupied nodes. For example, decisions may be informed by the number of start, special, reserved or blank nodes remaining.

Depending on the personality of the AI opponent, shorter or longer term goals may be preferred. For goals that forecast further into the future, probability and distance become important factors. Thus, the AI may be altered based on assessments of distance to special nodes, the probability of scoring on close versus distant nodes, and the odds of success of the overall overall strategy in consideration of some or all of the other factors herein described.

An important consideration in determining AI decisions is Urge. Urges as used herein describe the computer player's specific drive or desire to accomplish various long term and/or short term goals. Various types of Urges/goals include, but are not limited to:

1. Turbo Goal/Super Goal—E.g., Any specials left? Any King, 7 or Aces left? Any same suits left? Proximity from Players to special nodes. How many nodes away? Which direction (pathfinding)
2. Starter Discarder—Any starter nodes left? Any starter cards left?
3. Blocker—Attempts to foil other Players objectives
4. Joker Hoarder—Holds jokers for later swapping
5. First Out—Tries to be the first player to play all cards to earn point bonus
6. 4 Pointer—Search for 4 potential points in one of more moves
7. 3 Pointer—Search for 3 potential points in one of more moves
8. 2 Pointer—Search for 1 potential points in one of more moves
9. 1 Pointer—Search for 1 potential points in one of more moves A computer player may have dynamically changing priorities or urges, depending on how the topics above are progressing over time. Urges and personality types can change suddenly based on what is occurring during the game as conditions and probabilities change. Examples of computer player personalities include, but are not limited to: Conservative, Random, Risk Taker, Defender, Long term Strategy, Go for the Gold, Self Defense, Opponent Blocker and Oblivious. The effect on AI decision-making for most of these personality types are generally self-explanatory, but are also described in further detail in the examples.

The method for making decisions in a 2-deck game is based on several factors. These include the answers to the following questions:

1. Should a given card be played immediately or play another card and wait with the given card?
2. Should the computer draw a card and wait for a future opportunity?
3. Which locations contain future opportunities for points?
4. How many points are available at the different locations?
5. How many moves are required to achieve those values?
6. What is the personality of the player.?
7. How many card values are known (in players hand and on the board)?
8. What is the probability that the opponent will thwart the future plan?
9. If a Joker Swap is available that could lead a connection to a point should that be done?

To answer these questions, the computer must scan the board for opportunities and determine how many plays are required to reach these opportunities and the magnitude (points) of each opportunity. The computer calculates the value of various plans of action considering the relative values of obtaining a small number of points immediately or a larger amount of points in the future. This decision is a function of the personality of the player and the number of nodes that must be filled in order to reach a specific node having some future value.

The personality of the player can be envisioned as the desire a player has to assume some risk in order to obtain more points. This desire can be expressed as a declining desire as a function of the number of nodes that exist between the ready node and some future point counting node. The rate of decline is calculated as an exponential decline with varying coefficients that depend on the personality of the player. For example, a Risk Taker has a larger coefficient than a Conservative player. The result is that the decline in desire is faster for the Conservative than for the Risk Taker.

Another consideration is the number of points that are perceived as future points. The more points that are possible, the more a player may be willing to wait for that opportunity. A further consideration is the potential for the opponent to thwart the plan. This is calculated as the probability the opponent has a card or cards that can thwart the plan by blocking the path to the desired node. In this case the further away the desired node is, the more probable the path can be blocked. This probability is calculated as an increasing value that gets larger exponentially as the number nodes between the ready node and the desired future node. The fewer cards an opponent has in their hand the lower the probability they can block the plan.

Additionally, the probability of blockage is influenced by the number of cards that may be observed on the board. The more cards that can be identified as non-interfering the lower the possibility that the plan can be blocked.

These calculations are incorporated into the decision making functions of the electronic game described herein. Examples of the results of such calculations in several specific situations have been provided in the examples.

Decline (or Decay) Rate is defined as the rate at which the desire to wait for a future play with more value. It is calculated for different personalities using a coefficient that is raised to a power equivalent to the number of plays necessary to reach the desired node in the future. A Conservative player should receive a low coefficient so that the desire declines rapidly with distance. A useful value is 0.3 for a Conservative player. On the other hand a Risk Taker would choose to wait for a bigger reward and receives a larger coefficient. A useful value for the Risk Taker is 0.7 and the desire declines more slowly with the number of plays.

Probability of Opponent Blocking the Plan is a function of the number of cards the opponent has in their hand. It is assumed the for any given play, the opponent may have 2 cards that will interfere with the plan. The probability is calculated by multiplying the number of cards in the opponents hand by the probability they have 2 out of 110 cards that are detrimental. The number of detrimental cards is assumed to increase by 2 for each new node that is played. This value is further reduced by considering how many cards may be observed on the board, so that the number of potential interfering cards can be assessed. As the number of known cards increases, the probability that the opponent has some interfering card declines. This is taken into account by multiplying the fraction of cards remaining unknown by the opponents probability. This product is called the "Probability for Interference".

Potential Points represents the potential points that can be earned in a given play.

Possibility to Play is the product of the number of Potential Points and the Probability of Opponent Blocking the Plan. It declines as the number of nodes that must be played increases.

Desire to Play is a function of the personality of the player. Risk Takers are willing to wait to get more points in a future move and Conservative players want points when the opportunity arises. Desire to Play is a number calculated from the Decline Rate of the personality and the number of points that can be earned in some future play. The computer calculates a decision to play based on a threshold value for the Desire to Play. For any personality, a value 0.3 or greater means they want to play. To determine if the card should be played in the next or future plays. The computer must scan the board and locate potential future points and the number of nodes that must be filled in order to earn those points. Any node in which the calculated value is greater than 0.3 could be chosen for play. However, the values for low value close proximity points vs higher high value points must be compared to assess if it is worth waiting for more points in the future. When the calculated Desire to Play value for high points in the future is greater than the calculated value for Desire to Play on close proximity points, then the player chooses the higher value decision.

As different computer player AI personalities form, they may be given additional Mythical Values which represent feelings they may have towards different types of cards in different conditions of the game—how many cards in deck, how many played on board, what % of the board filled, early in game, late in game, number of players, etc.

These feelings do not have any empirical evidence to substantiate the player's feeling towards the cards through the evolution of the game. Rather, they represent strong modifiers for their desire, based on personal feelings which are quantified via the Mythical Values. Tables representing exemplary mythical values for a Conservative and a Risk Taker personality is presented in FIG. 21.

The following examples demonstrate exemplary calculations for decision plays:

Example 1

The calculated Desire to Play values for making 1 Point on the next play: Conservative=0.3, Risk Taker=0.6; The calculated Desire to Play values for making 15 points in three future moves are: Conservative=0.1, Risk Taker=2.2. Thus, the Conservative player has no desire to wait and the Risk Taker sees a better opportunity in the future.

Example 2

The calculated Desire to Play values for making 1 Point on the next play are: Conservative=0.3, Risk Taker=0.6; The calculated Desire to Play values for making 2 points in next play are: Conservative=0.5, Risk Taker=1.3; The calculated Desire to Play values for making 15 Points in 3 future moves are: Conservative=0.3, Risk Taker=3.6. Thus, the Conservative player sees no advantage to wait but the Risk Taker sees a good potential for waiting. From these examples, it can be seen that by an appropriate calculation, the AI player can make credible decisions as to decide on future plays and choose between short and long term goals.

Another important consideration in determining AI moves includes the probability that an opponent may thwart the computer player's plan. Sample probabilities for different scenarios are provided in FIG. 13.

For example, consider a plan to connect from point A to point B. The important consideration is how many intervening nodes must be filled in the correct sequence in order to make the connection. When the hands are dealt, a calculation can be performed of the probability that the dealt cards can be connected to achieve a particular GOAL. Excluding Jokers for the moment these are the odds of a player possessing the right cards to connect the nodes between the present position and the goal:

| Number of nodes that need to be filled | Odds you have the needed cards |
| --- | --- |
| 1 | 1 in 7 |
| 2 | 1 in 49 |
| 3 | 1 in 326 |
| 4 | 1 in 2173 |
| 5 | 1 in 14486 |
| 6 | 1 in 96571 |
| 7 | 1 in 643804 |

To get 1 point a player only needs to fill one adjacent node. If they are fortunate to have the opportunity to be next to a node that can offer 2, 3 or 4 points by filling only one adjacent node the probability is still 1 in 7.

In the situation that the player is starting on a Seven Starting Node, the probability they can connect to the node between the closest Starting King and Starting Ace, they have to fill three connecting nodes and the chances are 1 in 326.

Similarly, to connect from a Starting King or Ace to the closest Special Node to make a Special 5 points, a player needs to fill 4 nodes with a probability of 1 in 2173. Or to connect from a Starting Seven to a Special Node they need to fill 5 nodes with a probability of 1 in 14486. Or to connect between an Ace or King to the next closest Special Node they need to fill 6 nodes and the probability is 1 in 96571.

These odds against get even higher if the Goal is to connect between a Starting 7 with a Special Node in which the card placed on the Special Node is an Ace, King or Seven.

It can be observed that a player has to be pretty lucky to have the right cards in their hand. However, they might not have all of the cards needed and their opponent may play the missing cards as well. As each card can only have 5 (2 of the same suit with 1 higher and 1 lower value, or 3 of the same value with different suits) other matching cards adjacent to it, there is a potential that an opponent will fill in the one needed missing card.

On the flip side of the coin, the chances an opponent will fill in the wrong card are higher. The chances an opponent will actually have the offending or beneficial cards are higher and lower respectively. Thus, there is always a greater chance the opponent will do the wrong thing, so in pursuing a given goal, the choice of play will depend on how optimistic a player is in taking that approach. This is where Urges need to be considered. Some tend to risk takers, while others tend to be more conservative.

As the game progresses, more cards are revealed on the board. Thus, the probability that an opponent may obstruct objectives may decline. For example if a player has no knowledge of any cards other than their own, there is a small chance the opponent has at least one card that will obstruct them. If the board has 30 cards on the nodes, the opponents chances decline even more.

Figure 14:
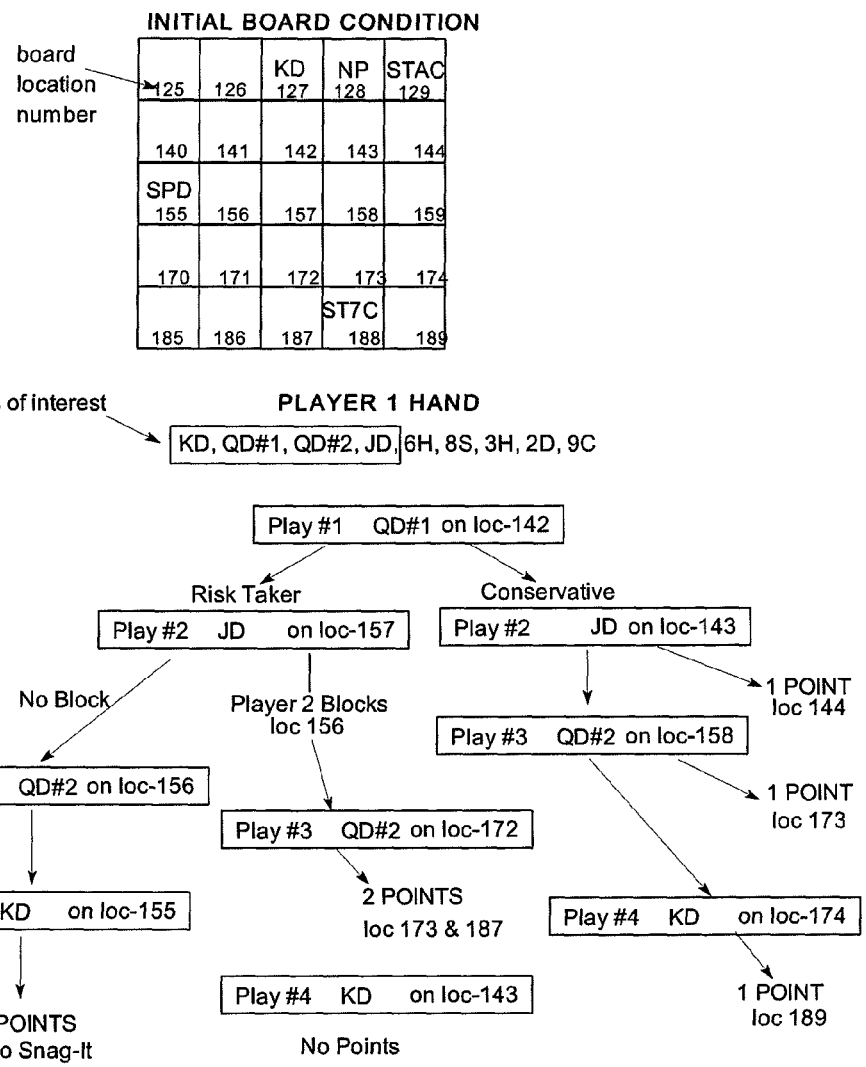
FIG. 14 is a game board portion and a flow diagram for exemplary AI decision making that is useful for understanding the present invention.
Figure 15:
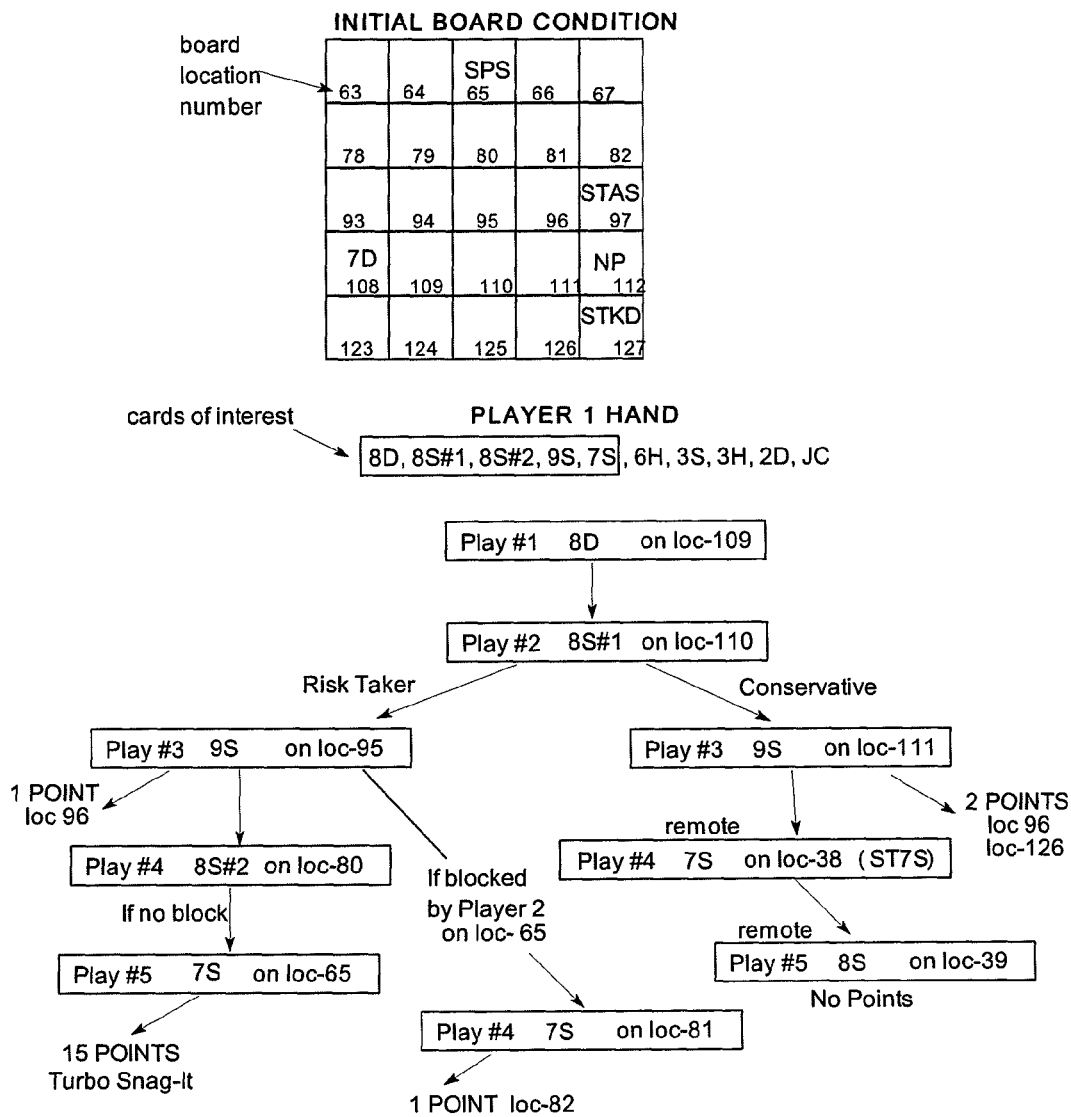
FIG. 15 is a game board portion and a flow diagram for exemplary AI decision making that is useful for understanding the present invention.
Figure 18:
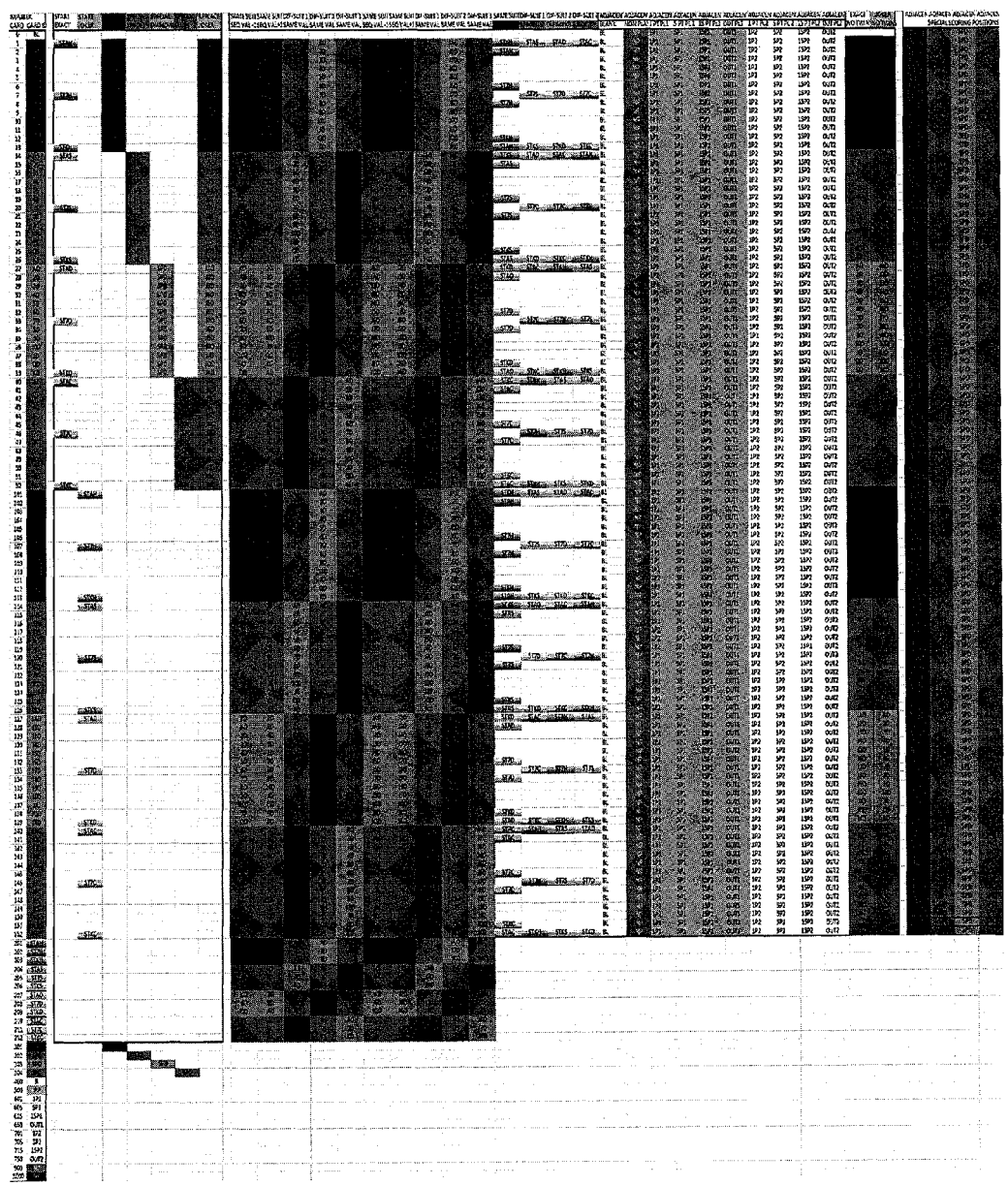
FIG. 18 is a table depicting data used in an exemplary electronic game of SNAG-IT© that is useful for understanding the present invention.
Figure 20:
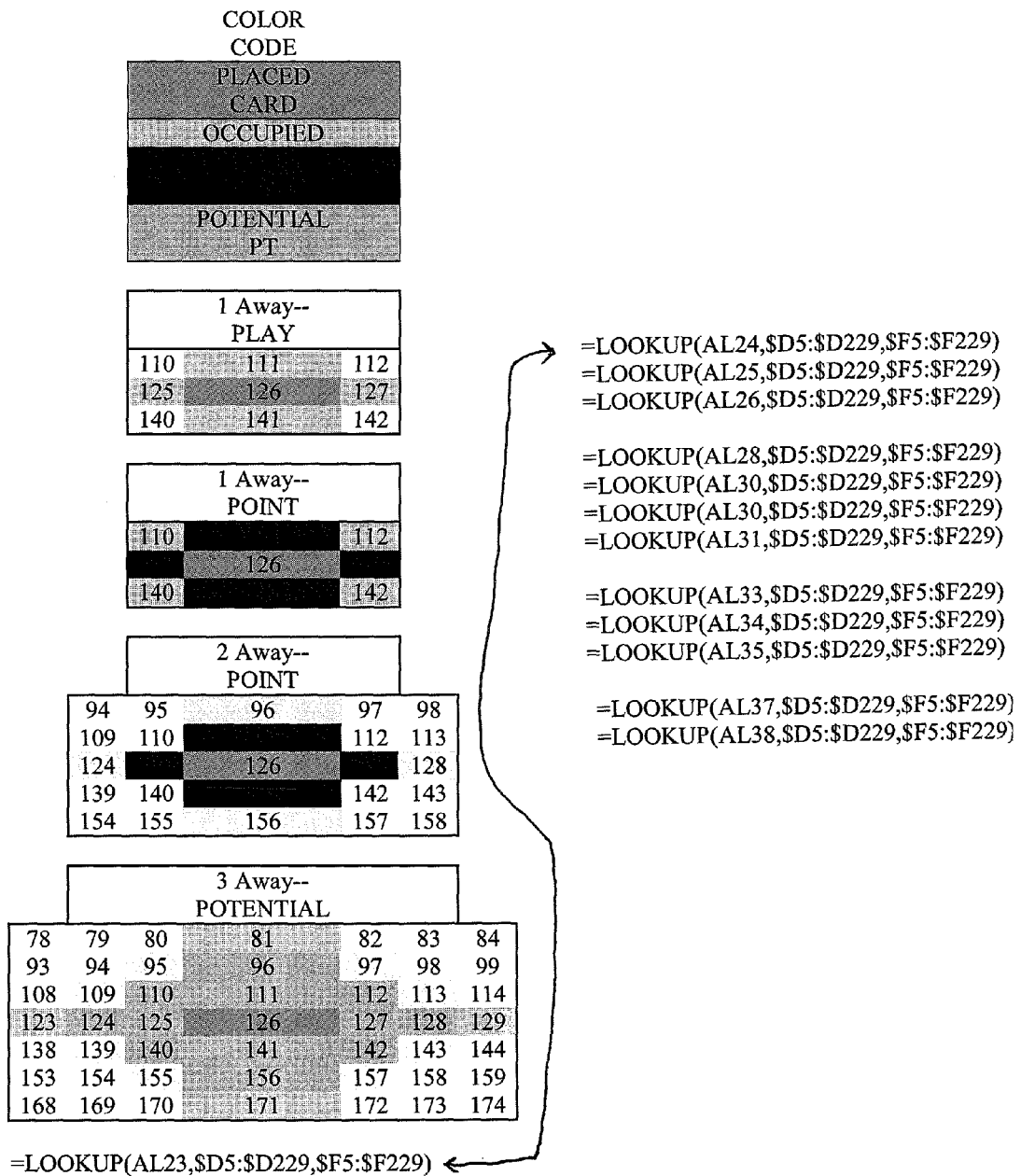
FIG. 20 is a table and sample logic coding used for a method for determining how the machine will regulate and restrict points and scoring in an exemplary electronic game of SNAG-IT© that is useful for understanding the present invention.

FIGS. 14, 15 and 16 present a set of charts and decision trees that consider specific Goals. For example, to develop AI for the computer, then the computer must calculate the probabilities that its opponent will stop the progress towards that Goal. This requires knowledge of the cards that are known (computers hand and on the board) and the probability that its opponent will have the offending cards in their hand as opposed to unknown cards in the deck. The fewer cards they have, the lower the probability they can stop them from reaching the Goal.

The AI must quantify the choice of a decision to pursue a given Goal in terms of the style of different players. For example, an optimist will assume the opponent does not have the bad cards and will joyfully pursue this intended path. A pessimist will assume that the opponent always has the cards that will thwart any plan of more than 1 placement. There are a wide range of styles fall in between.

Example AI Decision #1

Referring now to FIG. 14, there is a KD (King of Diamonds) on the KD Starting Node of the board location 127 (loc-127). Player 1's hand contains a KD, QD#1, QD#2, JD and 5 other cards and it is Player 1's turn. There is the possibility of making a Turbo Snag-It (15 points) by connecting from the KD on the board to the Special Diamond Node (loc-155) in 4 moves. Player 1 places a QD#1 on loc-142 as the first play in a series. Player 1's second play is the JD and will depend on his Urge/Goal. A Conservative—would place the JD on Loc-143 to gain immediately 1 point and hopes that in the next play to get another point by placing the QD#2 on loc-158. An Optimistic-Risk Taker—would place the JD on Loc-157 hoping to make either 2 points on the next the next play by placing QD#2 on Loc-171, or hoping to make 15 points in two plays by placing QD#2 on loc-156 first and then in the next move by placing the KD on the Special Diamond Node (loc-155). If Player 2 thwarts any hope of making a Turbo Snag-It by placing a blocking card on loc-156, Player 1 can still make 2 points by placing QD#2 on loc-156 and the KD can still be disposed of on loc-143 with no gain in points, but no chance of holding a potential −5 points at the end of the game. Similar arguments apply if Player is first play is QD on loc-126, etc. A flow diagram of this scenario is also provided in FIG. 14. Note: The Conservative player has a good chance of gaining 3 points. The Risk Taker may only get 2 points if he is blocked, but he will get 15 points if he is not blocked.

Example AI Decision #2

Referring now to FIG. 15, there is a 7D (real card) on the 7D Starting Node of the board location 108 (loc-108). Player 1's hand contains an 8D, 8S#1, 8S#2, 9S, 7S and 5 other cards and it is Player 1's turn. There is the possibility of making a Turbo Snag-It (15 points) by connecting from the 7D on the board to the Special Spade Node (loc-65) in 5 moves. Player 1 places a 8D on loc-109 as the first play in a series. Player 1's second play is the 8S#1 on loc-110. Player 1's third play will depend on the personality of the player. A Conservative player would place the 9S on Loc-111 to gain immediately 2 points. An Optimistic-Risk Taker would place the 9S on Loc-95 making only 1 point but hoping to make 15 points in two plays by placing 8S#2 on loc-80 first and then in the next move by placing the 7S on the Special Spade Node (loc-65). If Player 2 thwarts any hope of making a Turbo Snag-It by placing a blocking card on loc-65, Player 1 can still make 1 point by placing 7S on loc-81 while disposing of a potential −5 points at the end of the game. The Conservative player in their 4$^{th}$ play opts to dispose of the 7S on the Starting 7S Node in a remote location (not shown on flow chart) so as not to be stuck with a potential −5 points at the end of the game. However, this course of action does not yield any additional points. In this example both the Risk Taker and the Conservative could end up with the same number of points (2 points), but by taking a risk and only going for 1 point initially, the Risk Taker can gain 15 points if the path is not blocked by an opponent. A flow diagram of this scenario is also provided in FIG. 15.

FIG. 16 presents an exemplary flow diagram of a procedure employed in scanning for points. Any time two ready nodes are adjacent to each other, either linearly or diagonally, there is a chance a point can be made. In the diagonal arrangement, placing a card between the two adjacent ready nodes will generate two (2) points. In a linear arrangement, by placing a card in either of the two ready nodes, the other ready node may become a point if no sequence can be made between the four (4) nodes involved.

Having thus described the invention of the present application in detail and by reference to illustrative embodiments thereof, it will be apparent that modifications and variations are possible without departing from the scope of the invention defined in the appended claims.

What is claimed is:

1. A method for playing an electronic game on an electronic device comprising an electronic circuit, an input device and a display, the method comprising:
   receiving a selection of number and location of human players, the number of computer players and the number of decks for the game by the electronic circuit;
   receiving, by the electronic circuit, at least one descriptor for each computer player, the descriptor comprising selection from a predetermined personality type list and selection from a predetermined list of urges;
   shuffling, by the electronic circuit, the deck(s) of cards;
   dealing each human and computer player by the electronic circuit a predetermined number of cards;
   displaying on the display by the electronic circuit the game board;
   providing, by the electronic circuit, a player turn to each human and computer player, wherein each player turn results in placing a card on the game board or in the dealing of an additional card to the player; and,
   repeating, by the electronic circuit, the providing of player turns until an end of game situation occurs.

2. The method according to claim 1, wherein said personality type list comprises: Conservative, Random, Risk Taker, Defender, Long term Strategy, Go for the Gold, Self Defense, Opponent Blocker and Oblivious.

3. The method according to claim 1, wherein said list of urges comprises: the Two-Pointer, the Three Pointer, the Turbo Pointer, the Super Pointer, the starter Discarder, and the Joker Hoarder.

4. The method according to claim 1, further comprising: if one or more human players are remote, establishing by the electronic circuit over a communications interface, communication with each of the one or more remote human players, providing each remote player with ongoing game information, and receiving from each remote player during their turn the remote player's moves.

5. The method according to claim 1, further comprising, during a human player's turn receiving a selection of a card to play by the electronic circuit;
   highlighting on the display game board by the electronic circuit, locations where the selected card may be played;
   calculating, placing and displaying on the display game board by the electronic circuit one or more tokens representing earned points; and,
   calculating and displaying on the display game board by the electronic device a running tally of the game score.

6. The method according to claim 1, wherein during each computer player game turn, the electronic circuit uses an artificial intelligence (AI) process to determine the computer player's game moves, wherein the AI is affected by the selections from the predetermined personality type list, predetermined list of urges, and other game factors selected from the list comprising: game progress, value of other player cards, values of cards in hand, probability opponent will prevent needed future move.

7. The method according to claim 6, further comprising changing a computer player's selection from the predetermined personality type list and selection from the predetermined list of urges during a game based on game experience.

8. A system for playing an electronic game on an electronic device, comprising:
a display and an input device, operatively connected to
at least one electronic circuit configured to perform the steps of:
receiving a selection of number and location of human players, the number of computer players and the number of decks for the game by the electronic circuit;
receiving, by the electronic circuit, at least one descriptor for each computer player, the descriptor comprising selection from a predetermined personality type list and selection from a predetermined list of urges;
shuffling by the electronic circuit, the deck of cards;
dealing each human and computer player by the electronic circuit a predetermined number of cards;
displaying on the display by the electronic circuit the game board;
providing, by the electronic circuit, a player turn to each human and computer player, wherein each player turn results in placing a card on the game board or in the dealing of an additional card to the player; and,
repeating, by the electronic circuit, the providing of player turns until an end of game situation occurs.

9. The system according to claim 8, wherein said personality type list comprises: Conservative, Random, Risk Taker, Defender, Long term Strategy, Go for the Gold, Self Defense, Opponent Blocker and Oblivious.

10. The system according to claim 8, wherein said list of urges comprises: the Two-Pointer, the Three Pointer, the Turbo Pointer, the Super Pointer, the starter Discarder, and the Joker Hoarder.

11. The system according to claim 8, further comprising: if one or more human players are remote, establishing by the electronic circuit over a communications interface, communication with each of the one or more remote human players, providing each remote player with ongoing game information, and receiving from each remote player during their turn the remote player's moves.

12. The system according to claim 8, further comprising, during a human player's turn receiving a selection of a card to play by the electronic circuit; and,
highlighting on the display game board by the electronic circuit, locations where the selected card may be played.

13. The method according to claim 8, wherein during each computer player game turn, the electronic circuit uses an artificial intelligence (AI) process to determine the computer player's game moves, wherein the AI is affected by the selections from the predetermined personality type list, predetermined list of urges, and other game factors selected from the list comprising: game progress, value of other player cards, values of cards in hand, probability opponent will prevent needed future move.

14. The system according to claim 13, further comprising changing a computer player's selection from the predetermined personality type list and selection from the predetermined list of urges during a game based on game experience.

15. A device comprising a computer-readable storage medium, having stored thereon a computer program for a method for playing a computer game on an electronic device comprising and electronic circuit, an input device and a display, the method comprising:
receiving a selection of number and location of human players, the number of computer players and the number of decks for the game by the electronic circuit;
receiving, by the electronic circuit, at least one descriptor for each computer player, the descriptor comprising selection from a predetermined personality type list and selection from a predetermined list of urges;
shuffling by the electronic circuit, the deck(s) of cards;
dealing each human and computer player by the electronic circuit a predetermined number of cards;
displaying on the display by the electronic circuit the game board;
providing, by the electronic circuit, a player turn to each human and computer player, wherein each player turn results in placing a card on the game board or in the dealing of an additional card to the player; and,
repeating, by the electronic circuit, the providing of player turns until an end of game situation occurs.

16. The device according to claim 15, wherein said personality type list comprises: Conservative, Random, Risk Taker, Defender, Long term Strategy, Go for the Gold, Self Defense, Opponent Blocker and Oblivious.

17. The device according to claim 15, wherein said list of urges comprises: the Two-Pointer, the Three Pointer, the Turbo Pointer, the Super Pointer, the starter Discarder, and the Joker Hoarder.

18. The device according to claim 15, wherein the method further comprises: if one or more human players are remote, establishing by the electronic circuit over a communications interface, communication with each of the one or more remote human players, providing each remote player with ongoing game information, and receiving from each remote player during their turn the remote player's moves.

19. The device according to claim 15, wherein the method further comprises, during a human player's turn receiving a selection of a card to play by the electronic circuit; and,
highlighting on the display game board by the electronic circuit, locations where the selected card may be played.

20. The device according to claim 15, wherein during each computer player game turn, the electronic circuit uses an artificial intelligence (AI) process to determine the computer player's game moves, wherein the AI is affected by the selections from the predetermined personality type list, predetermined list of urges, and other game factors selected from the list comprising: game progress, value of other player cards, values of cards in hand, probability opponent will prevent needed future move.

* * * * *